United States Patent
Mathew et al.

(10) Patent No.: US 9,971,574 B2
(45) Date of Patent: May 15, 2018

(54) JSON STYLESHEET LANGUAGE TRANSFORMATION

(71) Applicant: Oracle International Corporation, Redwood Shores, CA (US)

(72) Inventors: Alex Mathew, Chennai (IN); Neesha Sinha, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 208 days.

(21) Appl. No.: 14/529,546

(22) Filed: Oct. 31, 2014

(65) Prior Publication Data
US 2016/0124722 A1  May 5, 2016

(51) Int. Cl.
G06F 9/44 (2006.01)
G06F 9/45 (2006.01)

(52) U.S. Cl.
CPC ............... *G06F 8/40* (2013.01); *G06F 8/51* (2013.01); *G06F 8/10* (2013.01); *G06F 8/20* (2013.01); *G06F 8/24* (2013.01); *G06F 8/52* (2013.01)

(58) Field of Classification Search
CPC ..... G06F 8/10; G06F 8/20; G06F 8/24; G06F 8/51; G06F 8/52; G06F 11/3664; G06F 11/3684; G06F 11/3688
See application file for complete search history.

(56) References Cited

U.S. PATENT DOCUMENTS

| | | | |
|---|---|---|---|
| 8,819,488 B1 * | 8/2014 | Arguelles | G06F 11/2635 714/25 |
| 8,893,077 B1 * | 11/2014 | Aiuto et al. | 717/104 |
| 9,558,020 B2 * | 1/2017 | Feng | G06F 9/45529 |
| 9,639,444 B2 * | 5/2017 | Arguelles | G06F 11/2635 |
| 2010/0057822 A1 | 3/2010 | Manolescu et al. | |
| 2010/0185862 A1 | 7/2010 | Moore et al. | |

(Continued)

FOREIGN PATENT DOCUMENTS

CN   102158482 A   8/2011

OTHER PUBLICATIONS

Pezoa et al., "Foundations of JSON Schema", ACM, WWW 2016, Apr. 2016, pp. 263-273; <https://dl.acm.org/citation.cfm?id=2883029&CFID=1023479967&CFTOKEN=66206411>.*

(Continued)

*Primary Examiner* — Thuy Dao
*Assistant Examiner* — Ben C Wang
(74) *Attorney, Agent, or Firm* — Kilpatrick Townsend & Stockton LLP

(57) ABSTRACT

Systems and methods are provided for specifying transformations of JSON objects using other JSON objects. A first object is received specified using JavaScript Object Notation. The first object includes a set of one or more attributes where each attribute is of a predetermined JSON data type and has at least one value. A second object is also received specified using JavaScript Object Notation. The second object includes a set of one or more attributes each corresponding to at least one attribute in the set of attributes of the first object and having at least one value defining one or more transformations. A third object specified using JavaScript Object Notation is generated based on transforming the first object using the second object.

24 Claims, 15 Drawing Sheets

(56) References Cited

U.S. PATENT DOCUMENTS

| | | | |
|---|---|---|---|
| 2010/0242018 A1* | 9/2010 | Balfe | G06F 8/20 717/118 |
| 2010/0318683 A1* | 12/2010 | Lange | G06F 8/52 709/246 |
| 2011/0119652 A1* | 5/2011 | Yu et al. | 717/108 |
| 2011/0307522 A1 | 12/2011 | Futty et al. | |
| 2011/0320527 A1* | 12/2011 | Turakhia | 709/203 |
| 2013/0132932 A1* | 5/2013 | Van Rozen | 717/124 |
| 2013/0218899 A1* | 8/2013 | Raghavan | G06F 17/30958 707/741 |
| 2013/0226944 A1 | 8/2013 | Baid et al. | |
| 2014/0006244 A1 | 1/2014 | Crowley et al. | |
| 2014/0067866 A1* | 3/2014 | Chen | 707/791 |
| 2014/0122412 A1 | 5/2014 | Bandekar et al. | |
| 2014/0222893 A1* | 8/2014 | Gangadharan | H04L 65/1016 709/203 |
| 2014/0222894 A1* | 8/2014 | Gangadharan | H04L 67/02 709/203 |
| 2014/0222957 A1* | 8/2014 | Gangadharan | H04L 67/141 709/217 |
| 2014/0222963 A1* | 8/2014 | Gangadharan | H04L 65/1016 709/219 |
| 2014/0223452 A1* | 8/2014 | Santhanam | H04L 67/141 719/328 |
| 2014/0279838 A1* | 9/2014 | Tsirogiannis et al. | 707/603 |
| 2014/0317169 A1* | 10/2014 | Shimizu et al. | 709/203 |
| 2015/0089470 A1* | 3/2015 | Shakespeare et al. | 717/108 |
| 2015/0205584 A1* | 7/2015 | De Smet | G06F 8/31 717/115 |
| 2015/0378994 A1* | 12/2015 | Kaplinger | G06F 17/3092 707/722 |
| 2016/0077902 A1* | 3/2016 | Feng | G06F 9/45529 719/328 |
| 2016/0080493 A1* | 3/2016 | Roth | G06F 9/45529 709/203 |
| 2016/0196173 A1* | 7/2016 | Arora | G06F 11/079 714/37 |
| 2017/0315791 A1* | 11/2017 | Mascaro | G06F 8/51 |

OTHER PUBLICATIONS

Afsariet al., "JavaScript Object Notation (JSON) data serialization for IFC schema in web-based BIM data exchange", Elsevier B.V., vol. 76, May 2017, pp. 24-51; <https://www.sciencedirect.com/science/article/pii/S0926580517300316>.*

Anjos et al., "SJSON: A Succinct Representation for JavaScript Object Notation Documents", IEEE, ICDIM 2016, Jan. 2017, pp. 173-178; <http://ieeexplore.ieee.org/stamp/stamp.jsp?tp=&arnumber=7829787>.*

Kotamrju, Jtendra. "Java API for JSON Processing: An Introduction to JSON." *Java API for JSON Processing*. Oracle Techology Network, Jul. 2013. Web. http://www.oracle.com/technetwork/articles/java/json-1973242.html [accessed May 20, 2014].

Inkster, Toby, "JSON::T—transform JSON using JsonT—metacpan.org." Mar. 21, 2013. Web. https://metacpan.org/pod/JSON::T [accessed May 20, 2014]. 6 pages.

International Search Report and Written Opinion dated Jan. 27, 2016, for International Application No. PCT/US2015/058374, 10 pages.

Cánovas Izquierdo Javier Luis, et al, "Discovering Implicit Schemas in JSON Data", Jul. 8, 2013, Grid and Cooperative Computing—GCC 2004: Third International Conference, Wuhan, China, Oct. 21-24, 2004 in: Lecture Notes in Computer Science, vol. 3251, p. 68-83.

"Processing JSON with jq", posted on Jul. 18, 2013 [Retrieved Jan. 31, 2018]. Retrieved from the Internet: <URL:https://zerokspot.com/weblog/2013/07/18/processing-json-with-jq/>, 4 pages.

European Application No. 15794735.9, Office Action dated Feb. 7, 2018, 4 pages.

* cited by examiner

JSON STYLESHEET LANGUAGE TRANSFORMATION

BACKGROUND OF THE INVENTION

JSON is an open standard format that uses human-readable text to transmit data objects consisting of attribute-value pairs. It is used primarily to transmit data between a server and a web application, as an alternative to XML. Although originally derived from the JavaScript scripting language, JSON is a language-independent data format. Code for parsing and generating JSON data is readily available in a large variety of programming languages.

Currently at the Enterprise level, the JSON data-format has been gaining lot traction as it's more flexible and easier to use than other web based data-formats. It is a highly preferred data format in the mobile world. JSON is promoted as a low-overhead alternative to other data formats that have widespread support for creation, reading and decoding in the real-world situations where they are commonly used. Apart from XML, other examples could include OGDL, YAML and CSV.

To transform JSON data, many conversion API's are available in the market. However, these API's are not user-friendly as they may require the user to learn another language to define the transformation. Oftentimes, users end up writing their own grammar to do so. Some API's even convert JSON to XML, apply the transformations, and then convert back to JSON. This results in a great amount of overhead processing.

Accordingly, what is desired is to solve problems relating to JSON transformations, some of which may be discussed herein. Additionally, what is desired is to reduce drawbacks relating to JSON transformation languages, some of which may be discussed herein.

BRIEF SUMMARY OF THE INVENTION

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

Systems and methods are provided for specifying transformations of JSON objects using other JSON objects. A first object is received specified using JavaScript Object Notation. The first object includes a set of one or more attributes where each attribute is of a predetermined JSON data type and has at least one value. A second object is also received specified using JavaScript Object Notation. The second object includes a set of one or more attributes each corresponding to at least one attribute in the set of attributes of the first object and having at least one value defining one or more transformations. A third object specified using JavaScript Object Notation is generated based on transforming the first object using the second object.

In one embodiment, a method for transforming JSON data includes receiving, at a computer, a first object specified using JavaScript Object Notation. The first object may have a set of one or more attributes with each attribute being of a predetermined JSON data type and having at least one value. A second object specified using JavaScript Object Notation is received that has a set of one or more attributes each corresponding to at least one attribute in the set of attributes of the first object and having at least one value defining one or more transformations. The first object is transformed into a third object specified using JavaScript Object Notation based on the second object.

In certain embodiments, receiving, at the computer, the second object includes receiving an object specified using JavaScript Object Notation having an attribute whose name corresponds to a name of an attribute of the first object. Receiving the object having the attribute whose name corresponds to the name of the attribute of the first object can include receiving the attribute as having the same name as the attribute of the first object. Receiving the object having the attribute whose name corresponds to the name of the attribute of the first object can include receiving the attribute as having a value that references the name of the attribute of the first object.

In further embodiments, receiving, at the computer, the second object can include receiving an attribute of an object specified using JavaScript Object Notation having a value that specifies an operation to be applied to either a name of an attribute of the first object or a value of the attribute of the first object. Receiving, at the computer, the second object can include receiving an attribute of an object specified using JavaScript Object Notation having a value that specifies a data type of an attribute of the third object corresponding to a transformation of the attribute of the first object. Receiving, at the computer, the second object can include receiving an attribute of an object specified using JavaScript Object Notation having a value that specifies a modification to one or more attributes of the first object.

In various embodiments, receiving, at the computer, the second object can include receiving an attribute of an object specified using JavaScript Object Notation having a value that defines one or more tests that define whether the one or more transformations are applicable to the first object. The one or more tests can be defined with respect to one or more attributes of the first object. A positive evaluation of the one or more tests may be determined and used to perform the one or more transformations. Performing, by the computer, the one or more transformations can include renaming an attribute of the first object, performing one or more numerical operations with respect to a value of an attribute of the first object, performing one or more string operations with respect to a value of an attribute of the first object, adding one or more attributes to an attribute of the first object which is also an object, or removing one or more attributes from an attribute of the first object which is also an object.

In one embodiment, a non-transitory computer-readable medium stores or is embedded with a computer program product executable by a processor of a computer system for transforming JSON data. The non-transitory computer-readable medium can include code for receiving a first object specified using JavaScript Object Notation, the first object having a set of one or more attributes, each attribute being of a predetermined JSON data type and having at least one value; code for receiving a second object specified using JavaScript Object Notation, the second object having a set of one or more attributes each corresponding to at least one attribute in the set of attributes of the first object and having at least one value defining one or more transformations; and code for transforming the first object into a third object specified using JavaScript Object Notation based on the second object.

In one embodiment, a system for transforming JSON data can include a hardware processor; and a memory storing a set of instructions which when executed by the processor cause the processor to: receive a first object specified using JavaScript Object Notation, the first object having a set of one or more attributes, each attribute being of a predetermined JSON data type and having at least one value; receive a second object specified using JavaScript Object Notation, the second object having a set of one or more attributes each corresponding to at least one attribute in the set of attributes of the first object and having at least one value defining one or more transformations; and transform the first object into a third object specified using JavaScript Object Notation based on the second object.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION OF THE INVENTION

Introduction

Figure 1:
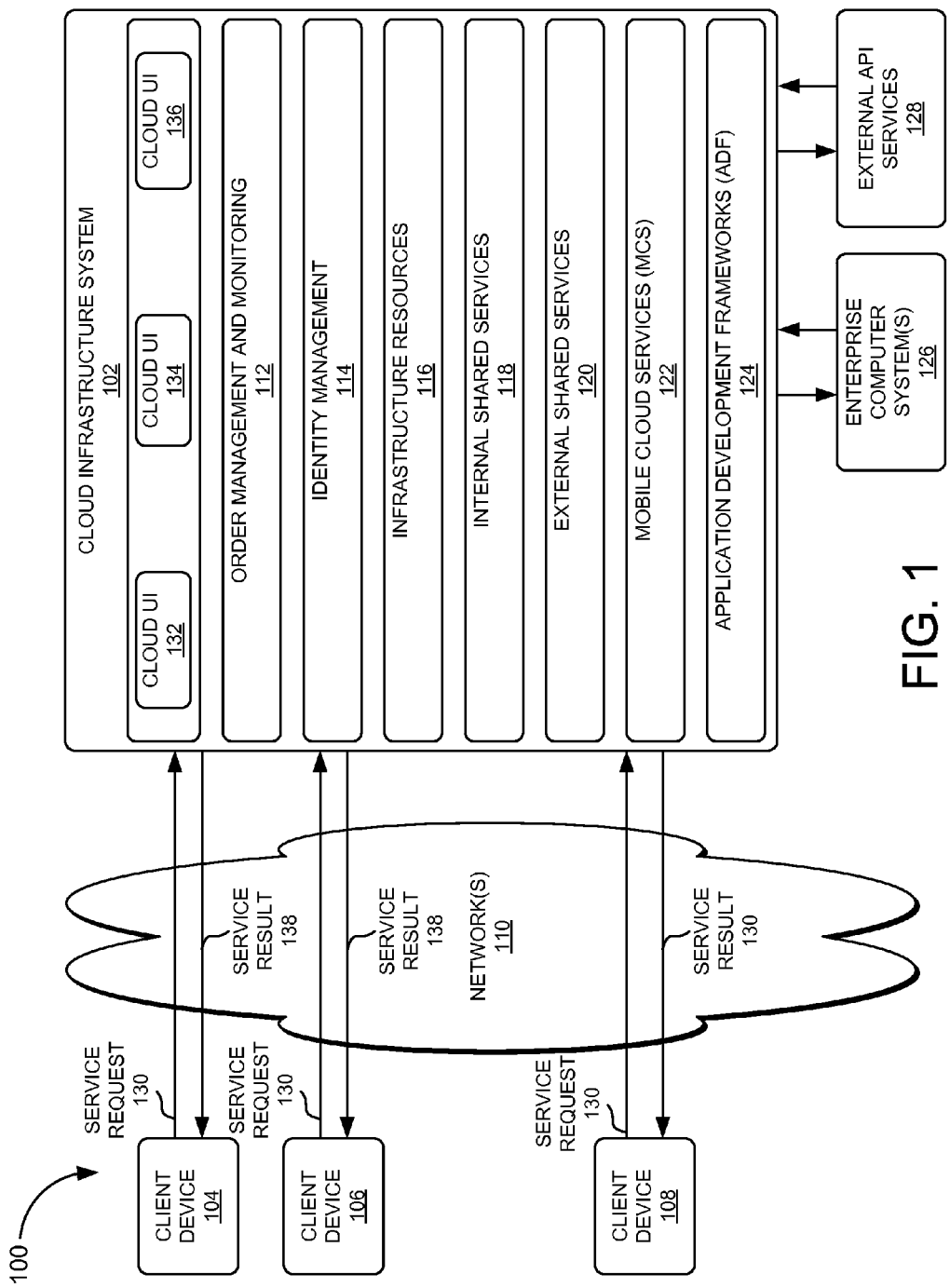
FIG. 1 is a simplified block diagram of components of a system environment by which services provided by the components of an embodiment system may be offered as mobile cloud services, in accordance with an embodiment of the present disclosure.

In the following description, for the purposes of explanation, specific details are set forth in order to provide a thorough understanding of embodiments of the invention. However, it will be apparent that various embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments. The figures and description are not intended to be restrictive. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" or "computer-readable medium" includes, but is not limited to, portable or non-portable storage devices, optical storage devices, wireless channels, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable or computer-readable medium. One or more processors may perform the necessary tasks.

Systems depicted in some of the figures may be provided in various configurations. In some embodiments, the systems may be configured as a distributed system where one or more components of the system are distributed across one or more networks in a cloud computing system. In further embodiments, the systems may be configured as a single system where one or more components of the system incorporated into a single structure or package.

FIG. 1 is a simplified block diagram of one or more components of system environment 100 by which services provided by one or more components of an embodiment system may be offered as cloud services, in accordance with an embodiment of the present disclosure. In the illustrated embodiment, system environment 100 includes cloud infrastructure system 102 that provides cloud services to one or more client computing devices 104, 106, and 108. Client computing devices 104, 106, and 108 may be used by users to interact with cloud infrastructure system 102. Client computing devices 104, 106, and 108 may be configured to operate a client application such as a web browser, a proprietary client application (e.g., Oracle Forms), or some other application, which may be used by a user of the client computing device to interact with cloud infrastructure system 102 to use services provided by cloud infrastructure system 102.

It should be appreciated that cloud infrastructure system 102 depicted in FIG. 1 may have other components than those depicted. Further, the embodiment shown in FIG. 1 is only one example of a cloud infrastructure system that may incorporate an embodiment of the invention. In some other embodiments, cloud infrastructure system 102 may have more or fewer components than shown in FIG. 1, may combine two or more components, or may have a different configuration or arrangement of components.

Client computing devices 104, 106, and 108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. Client computing devices 104, 106, and 108 can be general purpose personal computers including, by way of example, personal computers and/or laptop computers running various versions of Microsoft Windows®, Apple Macintosh®, and/or Linux operating systems. Client computing devices 104, 106, and 108 can be workstation computers running any of a variety of commercially-available UNIX® or UNIX-like operating systems, including without limitation the variety of GNU/Linux operating systems, such as for example, Google Chrome OS. Alternatively, or in addition, Client computing devices 104, 106, and 108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 110.

Although exemplary system environment 100 is shown with three client computing devices, any number of client computing devices may be supported. Other devices such as devices with sensors, etc. may interact with cloud infrastructure system 102.

Network(s) 110 may facilitate communications and exchange of data between clients 104, 106, and 108 and cloud infrastructure system 102. Network(s) 110 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Cloud infrastructure system 102 may comprise one or more computers and/or servers. These computer systems or servers may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, one or more computer systems or servers associated with cloud infrastructure system 102 may be adapted to run one or more services or software applications described in the foregoing disclosure. For example, one or more computer systems or servers associated with cloud infrastructure system 102 may correspond to a server for performing processing described herein according to an embodiment of the present disclosure.

One or more computer systems or servers associated with cloud infrastructure system 102 may run an operating system including any of those discussed above, as well as any commercially available server operating system. One or more computer systems or servers associated with cloud infrastructure system 102 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In certain embodiments, services provided by cloud infrastructure system 102 may include a host of services that are made available to users of cloud infrastructure system 102 on demand, such as online data storage and backup solutions, Web-based e-mail services, hosted office suites and document collaboration services, database processing, managed technical support services, and the like. Services provided by cloud infrastructure system 102 can dynamically scale to meet the needs of its users. A specific instantiation of a service provided by cloud infrastructure system 102 is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service instance instantiated by cloud infrastructure 102 may include protected computer network access to storage, a hosted database, a hosted web server, a software application, or other service provided by a cloud vendor to a user, or as otherwise known in the art. For example, a service instance instantiated by cloud infrastructure 102 can include password-protected access to remote storage on the cloud through the Internet. As another example, a service instance instantiated by cloud infrastructure 102 can include a web service-based hosted relational database and a script-language middleware engine for private use by a networked developer. As another example, a service instance instantiated by cloud infrastructure 102 can include access to an email software application hosted on a cloud vendor's web site.

In certain embodiments, cloud infrastructure system 102 may include a suite of applications, middleware, development service, and database service offerings that are delivered to a customer in a self-service, subscription-based, elastically scalable, reliable, highly available, and secure manner. An example of such a cloud infrastructure system as embodied in cloud infrastructure service 102 is the Oracle Public Cloud provided by the present assignee.

Cloud infrastructure system 102 may provide the cloud services via different deployment models. For example, services may be provided under a public cloud model in which cloud infrastructure system 102 is owned by an organization selling cloud services (e.g., owned by Oracle) and the services are made available to the general public or different industry enterprises. As another example, services may be provided under a private cloud model in which cloud infrastructure system 102 is operated solely for a single organization and may provide services for one or more entities within the organization. The cloud services may also be provided under a community cloud model in which cloud infrastructure system 102 and the services provided by cloud infrastructure system 102 are shared by several organizations in a related community. The cloud services may also be provided under a hybrid cloud model, which is a combination of two or more different models.

In some embodiments, the services provided by cloud infrastructure system 102 may include one or more services provided under Software as a Service (SaaS) category, Platform as a Service (PaaS) category, Infrastructure as a Service (IaaS) category, or other categories of services including hybrid services. In some embodiments, the services provided by cloud infrastructure system 102 may include, without limitation, application services, platform services and infrastructure services. In some examples, application services may be provided by cloud infrastructure system 102 via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 102 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 102 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by cloud infrastructure system 102 and also control the deployed services. In some embodiments, platform services provided by cloud infrastructure system 102 may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in cloud infrastructure system 102. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 102 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 102, and the like. In various embodiments, cloud infrastructure system 102 may be adapted to automatically provision, manage and track a customer's subscription to services offered by cloud infrastructure system 102. A customer, via a subscription order, may order one or more services provided by cloud infrastructure system 102. Cloud infrastructure system 102 then performs processing to provide the services in the customer's subscription order.

In one embodiment, as depicted in FIG. 1, cloud management functionality may be provided by one or more modules, such as order management and monitoring module 114. These modules may include or be provided using one or more computers and/or servers, which may be general purpose computers, specialized server computers, server farms, server clusters, or any other appropriate arrangement and/or combination.

In exemplary operation, a customer using a client device, such as one or more of client computing devices 104, 106 or 108, may interact with cloud infrastructure system 102 by requesting one or more services provided by cloud infrastructure system 102. The customer may issue service request 134 cloud infrastructure system 102 using a variety of means. Service request 134 may include placing an order for a subscription for one or more services offered by cloud infrastructure system 102, accessing one or more services offered by cloud infrastructure system 102, or the like. In certain embodiments, the customer may access a cloud User Interface (UI), cloud UI 132, cloud UI 134 and/or cloud UI 138 and place a subscription order via these UIs. The order information received by cloud infrastructure system 102 in response to the customer placing an order may include information identifying the customer and information identifying one or more services offered by the cloud infrastructure system 102 to which the customer intends to subscribe. After an order has been placed by the customer, the order information is received via the cloud UIs, 132, 134 and/or 138.

In this example, order management and monitoring module 114 sends information received from a customer to an order database to have the order placed by the customer stored in recorded. The order database can be one of several databases operated by cloud infrastructure system 102 and operated in conjunction with other system elements. Order management and monitoring module 114 may forward information that includes all or part of the order information stored in the order database to an order management module. In some instances, the order management module may be configured to perform billing and accounting functions related to the order, such as verifying the order, and upon verification, booking the order.

Order management and monitoring module 114 may communicate all or part of the order information to an order orchestration module that utilizes the order information to orchestrate the provisioning of services and resources for the order placed by the customer. In some instances, the order orchestration module may orchestrate the provisioning of resources to support the subscribed services using the services of an order provisioning module.

In certain embodiments, the order orchestration module enables the management of business processes associated with each order and applies business logic to determine whether an order should proceed to provisioning. Upon receiving an order for a new subscription, the order orchestration module sends a request to the order provisioning module to allocate resources and configure those resources needed to fulfill the subscription order. The order provisioning module enables the allocation of resources for the services ordered by the customer. The order provisioning module provides a level of abstraction between the cloud services provided by cloud infrastructure system 102 and the physical implementation layer that is used to provision the resources for providing the requested services. The order orchestration module may thus be isolated from implementation details, such as whether or not services and resources are actually provisioned on the fly or pre-provisioned and only allocated/assigned upon request.

In certain embodiments, order management and monitoring module 114 manages and tracks a customer's subscription order. In some instances, order management and monitoring module 114 may receive information indicative of any provisioned services and/or resources associated with the customer. Order management and monitoring module 114 may be configured to collect usage statistics for the services in the subscription order, such as the amount of storage used, the amount data transferred, the number of users, and the amount of system up time and system down time.

Once services and resources are provisioned in the above example, service result 138 may be sent to customers on client computing devices 104, 106, and/or 108 informing the customer of the provided services and/or resources. In instances where service request 130 includes a request to access a service or have a service perform one or more operations, service result 138 may be send to customers on client computing devices 104, 106, and/or 108 providing the requested access or results of any operations, services performed, or data requested.

In certain embodiments, cloud infrastructure system 100 may include identity management module 114. Identity management module 114 may be configured to provide identity services, such as access management and authorization services in cloud infrastructure system 102. In some embodiments, identity management module 114 may control information about customers who wish to utilize the services provided by cloud infrastructure system 102. Such information can include information that authenticates the identities of such customers and information that describes which actions those customers are authorized to perform relative to various system resources (e.g., files, directories, applications, communication ports, memory segments, etc.) Identity management module 114 may also include the management of descriptive information about each customer and about how and by whom that descriptive information can be accessed and modified.

In certain embodiments, cloud infrastructure system 102 may also include infrastructure resources 116 for providing the resources used to provide various services to customers of cloud infrastructure system 102. In one embodiment, infrastructure resources 116 may include pre-integrated and optimized combinations of hardware, such as servers, storage, and networking resources to execute the services provided by the PaaS platform and the SaaS platform.

In some embodiments, resources in cloud infrastructure system 102 may be shared by multiple users and dynamically re-allocated per demand. Additionally, resources may be allocated to users in different time zones. For example, cloud infrastructure system 102 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 118 may be provided that are shared by different components or modules of cloud infrastructure system 102 and by the services provided by cloud infrastructure system 102. These internal shared services 118 may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, a number of external shared services 120 may be provided that are shared by different components or modules of cloud infrastructure system 102 and by the services provided by cloud infrastructure system 102. These external shared services 120 may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In various embodiments, external shared services 120 may include one or more components that provide access, data transformation, automation, or the like to enterprise computer system(s) 126. Access to enterprise computer system(s) 126 may be shared by different components or modules of cloud infrastructure system 102 and by the services provided by cloud infrastructure system 102. In some embodiments, access to enterprise computer system(s) 126 may be shared by service instances provided by cloud infrastructure system 102 that are restricted to one or more subscribers.

In further embodiments, external shared services 120 may include external application programming interface (API) services 128 that are shared by different components or modules of cloud infrastructure system 102 and by the services provided by cloud infrastructure system 102. These external API services 128 may include, without limitation, APIs provided by other third party services or entities.

Various different mobile cloud services may be provided by mobile cloud service (MSC) 122 in cloud infrastructure system 102. MCS 122 facilitates communication between a mobile computing device and enterprise computer systems (e.g., enterprise computer systems 124 and 126) according to some embodiments of the present invention. MCS 122 may include one or more memory storage devices ("local storage") used to store enterprise data and authentication information. Enterprise data may be received from enterprise computer systems 126 or from client computing devices 104, 106, or 108 or may include enterprise data converted by cloud infrastructure system 102, or combinations thereof. Authentication information may be received from identity management system 116 and/or generated by cloud infrastructure system 102. In some embodiments, authentication information may include information indicating security authentication of a user with regard to a request for a service.

Enterprise computer systems, such as enterprise computer systems 126 may be physically located beyond a firewall of cloud infrastructure system 102 at a different geographic location (e.g., remote geographic location) than cloud infrastructure system 102. In some embodiments, enterprise computer systems 126 may include one or more different computers or servers. In some embodiments, enterprise computer systems 126 may be part of a single computer system.

In certain embodiments, enterprise computer systems 126 may communicate with cloud infrastructure system 102 using one or more different protocols. Each of enterprise computer systems 126 may communicate with cloud infrastructure system 102 using a different communication protocols. Enterprise computer systems 126 may support the same or different security protocols. In some embodiments, MSC 1112 may include an agent system to handle communication with enterprise computer systems 126.

A protocol may include a communication protocol, such as SPDY. A protocol may include an application protocol such as an HTTP-based protocol. In some embodiments, enterprise computer systems 126 may communicate with cloud infrastructure system 102 using a REST or SOAP communication protocols. For example, REST protocol may support a formats including URI or URL. Enterprise Data formatted for communication using REST protocol may be easily converted to data formats such as JSON, comma-separated values (CSV), and really simple syndication (RSS). Enterprise computer systems 126 and cloud infrastructure system 102 may communicate using other protocols such as remote procedure calls (RPC) (e.g., XML RPC).

In some embodiments, MCS 122 may include an adaptor interface configured to support communication with one or more services provided by cloud infrastructure service 102, some of which may support different protocols or techniques for communications. In some embodiments, MCS 122 may include an adaptor interface configured to support communication with enterprise computer systems 126, some of which may support different protocols or techniques for communications. MCS 122 may include one or more adaptors each of which may be configured to communicate according to a communication protocol, a type of enterprise computer system, a type of application, a type of service, or combinations thereof. A communication protocol supported by an adaptor may be specific to a service or one or more of enterprise computer systems 126.

In certain embodiments, client computing devices 104, 106, and 108 may each implement an application that can provide specific user interfaces to communicate with MCS 122. A specific UI may be configured to communicate using a specific communication protocol. In some embodiments, specific UIs may include callable interfaces, functions, routines, methods, and/or operations that may be invoked to communicate with MCS 122. Specific UIs may accept as input parameters for communicating with a service provided by cloud infrastructure service 102 or with enterprise computer systems 126 for enterprise data and/or to request a service. In some embodiments, communication through MCS 122 may be converted for communication using a custom communication protocol. In some embodiments, specific UIs may correspond to a custom client in an application.

MCS 122 may include one or more callable interfaces, e.g., an application programming interface (API). Callable interfaces associated with MCS 122 may enable an app on a mobile computing device to communicate requests to MCS 122. Callable interfaces associated with MCS 122 may support a common or standard interface, which may allow requests including their parameters to be received from apps according to a standardized protocol, architectural style, and/or format (e.g., a REST protocol). Callable interfaces associated with MCS 122 may be configurable by a user of any one of computing devices 104, 106, or 108. Callable interfaces associated with MCS 122 may receive requests for services according to a communication protocol. Device application developers can connect to MCS 122 for their custom applications. In some embodiments, a callable interface associated with MCS 122 may be configured by the same person that develops an app, such that the person can implement a custom app to communicate with MCS 122.

Callable interfaces associated with MCS 122 may further enable enterprise computer systems 126 to communicate with MCS 122 according to a standardized protocol or format. Similar to application developers, those who manage enterprise computer systems can implement code (e.g., an agent system) that is configured to communicate with MCS 122 via one or more callable interfaces. Callable interfaces associated with MCS 122 may be implemented based on a type of a computing device, a type of enterprise computer systems, an app, an agent system, a service, a protocol, or other criterion. In some embodiments, callable interfaces associated with MCS 122 may support requests for services including authentication, compression, encryption, pagination with cursors, client-based throttling, non-repudiation, logging, and metrics collection. In some embodiments, callable interfaces associated with MCS 122 may be implemented for custom business-related services, such as authentication, policy enforcement, caching of responses, throttling of calls to MCS 122, translation between asynchronous and synchronous patterns, logging of calls to underlying services, or combinations thereof. In some embodiments, callable interfaces associated with MCS 122 may enable users to load custom code for implementation by cloud infrastructure system 102. The custom code may implement one or more callable interfaces associated with MCS 122 for cloud infrastructure system 102, which can enable users to access custom services or other enterprise computer systems.

Protocol translators associated with MCS 122 may process a message to determine a communication protocol for a message and/or to convert a message to a communication protocol for a destination. Protocol translators associated with MCS 122 may convert a request received from client computing devices 104, 106, or 108. The request may be converted from a format of a communication protocol supported by client computing devices 104, 106, or 108 to a format of a communication protocol supported by a service provided by cloud infrastructure service 102 or enterprise computer systems 126. Protocol translators associated with MCS 122 may convert a response received from a service provided by cloud infrastructure service 102 or enterprise computer systems 126. A response may be converted from a format of a communication protocol supported by a service provided by cloud infrastructure service 102 or enterprise computer systems 126 to a format of a communication protocol supported by client computing devices 104, 106, or 108.

Security services associated with MCS 122 may manage security authentication for requests received from any of client computing devices 104, 106, or 108. Security services associated with MCS 122 may protect the integrity of customer processes and enterprise data. To prevent system or data from being compromised, security authentication may occur when a request is received from client computing devices 104, 106, or 108. Security authentication may be performed before a request is dispatched for processing by cloud infrastructure system 102. The security authentication determined for a user may enable a user associated with a mobile computing device to have authorization to request services via MCS 122. The security authentication may reduce efforts for a user to authenticate for different requests and/or services requested via MCS 122. Security services associated with MCS 122 may be implemented as one or more functional blocks or modules configured to perform various operations authenticating security of a request.

Authentication services associated with MCS 122 may manage security authentication for requests received from client computing devices 104, 106, or 108. Authentication services associated with MCS 122 may determine security authentication for a user associated with a computing device that sends a request to MCS 122. Security authentication may be determined based on a time period, which may be tied to operation of an app (e.g., launching an app), a request, a computing device, an enterprise computer system, other criterion related to a request, or combinations thereof. Security authentication may be verified and granted for any one of the following, such as an individual request, one or more enterprise computer systems, a particular service, a type of service, a user, a computing device, other criterion for determining security authentication, or combinations thereof. In some embodiments, cloud infrastructure system 102 may store authentication information of users received from enterprise computer systems or authentication systems supporting enterprise computer systems. Cloud infrastructure system 102 may determine authentication by performing a lookup function to determine whether an identity of a user associated with a request has authority to make such a request. The stored authentication information may include information such as the type of requests, functions, enterprise computer systems, enterprise data, or the like that a user may be authorized to access. In some embodiments, infrastructure system 102 may initiate communication with a requesting computing device to determine authentication.

In some embodiments, security authentication may be determined based on a role associated with a user requesting a service. The role may be associated with a user requesting access to MCS 122. In some embodiments, a user may request services as a subscriber or tenant of MCS 122 who may be granted access to resources and/or services provided by MCS 122. Authentication may correspond to a user's subscription to MCS 122, such that a user may be authorized to request services via MCS 122 as a subscriber. In some embodiments, the subscription may be limited to a particular set of resources provided by MCS 122. Security authentication may be based on the resources and/or services accessible to the user of MCS 122. In some embodiments, a request may be provisioned a template during execution called a "runtime environment." The runtime environment may be associated with resources that are allocated for a request, a user, or a device.

In some embodiments, authentication services associated with MCS 122 may request an identity management system to determine security authentication for the user. The identity management system may be implemented by cloud infrastructure system 102 (e.g., as identity management 114) or by another computer system that is external to cloud infrastructure system 102. Identity management 116 may determine security authentication of the user based on the user's role or subscription for accessing MCS 122. The role or subscription may be assigned privileges and/or entitlements with respect to an enterprise computer system, a service provided by an enterprise computer system, a function or feature of an enterprise computer system, other criterion for controlling access to an enterprise computer system, or combinations thereof.

Various different application development frameworks (ADFs) may be provided by application development frameworks (ADFs) 124 in cloud infrastructure system 102. ADFs 124 provide the infrastructure code to implement agile SOA based applications. ADFs 124 further provide a visual and declarative approach to development through one or more development tools (e.g., Oracle JDeveloper 11g development tool). One or more frameworks provided by ADFs 124 may implement a Model-View-Controller design pattern. Such frameworks offer an integrated solution that covers all the layers of the MVC architecture with solutions to such areas as Object/Relational mapping, data persistence, reusable controller layer, rich Web user interface framework, data binding to UI, security and customization. Extending beyond the core Web based MVC approach, such frameworks also integrate with the Oracle SOA and WebCenter Portal frameworks simplifying the creation of complete composite applications.

In certain embodiments, ADFs 124 make it easy to develop agile applications that expose data as services by coupling a service interface to built-in business services provided by cloud infrastructure system 102. This separation of business service implementation details is performed in ADFs 124 via metadata. Use of this metadata-driven architecture enables application developers to focus on the business logic and user experience, rather than the details of how services are accessed. In certain embodiments, ADFs 124 store implementation details of services in metadata in a model layer. This enables developers to exchange services without modifying the user interface, making the application extremely agile. Additionally, the developer creating the user interface does not need to bother with business service access details. Instead, developers can focus on developing the application interface and interaction logic. Creating the user experience can be as simple as dragging-and-dropping the desired business services onto a visual page designer and indicating what type of component should represent that data.

In various embodiment, developers interact with ADFs 124 to create modules forming enterprise applications. The enterprise applications can be executed within the context of cloud infrastructure system 102. In various embodiment, developers interact with ADFs 124 to create modules forming mobile applications. The mobile applications can be executed within the context of cloud infrastructure system 102. Features of the present invention described below may be implemented using any desired combination of programming language and application development framework as will be apparent to one skilled in the relevant arts by reading the disclosure provided herein.

One or more frameworks provided by ADFs 124 may be embodied as Oracle ADF in one example. Accordingly, a framework in ADFs 124 can be based on a Model-View-Controller (MVC) design pattern. An MVC application is separated into: 1) a model layer that handles interaction with data-sources and runs the business logic, 2) a view layer that handles the application user interface, and 3) a controller that manages the application flow and acts as the interface between the Model and the View layers. Separating applications into these three layers simplifies maintenance and reuse of components across applications. The independence of each layer from the others results in a loosely coupled, Service Oriented Architecture (SOA).

In various embodiments, ADFs 124 provide tools and resources allowing developers to create an application in the form of multiple layers, each layer containing code modules/files implementing desired logic according to pre-defined specification. Thus, in one embodiment, ADFS 124 enables the application to be developed as four layers: a view layer containing code modules/files that provide the user interface of the application, a controller layer containing code modules that control the flow of the application, a model layer containing data/code modules that provide an abstraction layer for the underlying data, and a business services layer containing code modules that provide access to data from various sources and handles business logic.

In certain embodiments, ADFs 124 let developers choose the technology they prefer to use when implementing each of the layers. EJB, Web Services, JavaBeans, JPA/EclipseLink/TopLink objects, and many others can all be used as Business Services for ADFs 124. View layers can include Web based interfaces implemented with JSF, Desktop Swing applications and MS Office front ends, as well as interfaces for mobile devices.

In one aspect, the view layer represents the user interface of the application being developed. The view layer can include desktop, mobile, and browser-based views, each of which provides all or a portion of the user interface and is accessible in a variety of manners corresponding to view type. For example, web pages may be sent by the application in response to receiving client requests containing corresponding URLs. The web pages may then be displayed by a browser on a display unit (not shown) associated with a requesting client system, thereby enabling users of the requesting client system to interact with the enterprise application. ADFs 124 support multi-channel access to business services allowing reuse of business services and access from a Web client, a client-server swing desktop-based application, Microsoft Excel spreadsheets, mobile devices such as a smart-phone, or the like.

The code files/modules forming the view layer (such as web pages) may be implemented using one or more of hypertext markup language (HTML), Java server pages (JSP), and Java Server Faces (JSF). Alternatively, the user interface may be implemented using Java components such as Swing, and/or extensible markup language (XML). As further noted, the user interface may leverage a user's experience and familiarity with desktop applications, such as Word and Excel by Microsoft.

As noted above, the relevant user-developed code/data modules are provided in each of the layers. However, each layer typically contains other pre-defined code/data modules provided by ADFs 124. Some of the pre-defined modules may be used during development, for example, as templates for developing the web pages, for including desired functionality in the developed code etc. Other pre-defined modules (such as a URL rewriting module) may be deployed along with the developed application and may provide additional functionalities (mapping of requested URLs to internal names) to the user during execution of the enterprise application.

A controller layer contains code modules/files that control the flow of the application. Each controller object contains software instructions and/or data implemented according to a desired manner of presenting information in the view layer. The desired manner may include the specific web pages to be displayed when links in another web page are clicked/selected by the user, the page to be displayed when errors occur during execution, indicating the specific data to be stored/retrieved, etc.

In one aspect, the controller layer manages the applications flow and handles user input. For example, when a Search button is clicked on a page, the controller determines what action to perform (do a search) and where to navigate to (the results page). There are two controller options for web-based applications in JDeveloper: the standard JSF controller or the ADF Controller that extends the JSF controller functionality. Whichever controller is used, application flow is typically designed by laying out pages and navigation rules on a diagram. An application's flow can be broken into smaller, reusable task flows; include non-visual components such as method calls and decision points in a flow; and create "page fragment" flows that run inside a region of a single containing page.

The code modules/files forming the controller layer are often implemented as Java servlets receiving the client requests and sending desired web pages as corresponding responses. Controller objects may also be implemented, for example, as Apache Jakarta Struts controllers or according to the JSF standard.

A model layer contains data/code modules that connect various business services to the objects that use them in the other layers, such as to the controller objects discussed above or directly to desktop applications as shown. Each abstract data objects of the model layer provides a corresponding interface that can be used to access any type of business service, executing in an underlying business service layer. The data objects may abstract the business service implementation details of a service from a client and/or expose data control methods/attributes to view components, providing a separation of the view and data layers.

In one aspect, the model layer consists of two components, data controls and data bindings, which utilize metadata files to define the interface. Data controls abstract the business service implementation details from clients. Data bindings expose data control methods and attributes to UI components, providing a clean separation of the view and model. Due to the metadata architecture of the model layer, developers get the same development experience when binding any type of Business Service layer implementation to the View and Controller layers.

In certain embodiments, ADFs 124 emphasizes the use of the declarative programming paradigm throughout the development process to allow users to focus on the logic of application creation without having to get into implementation details. At a high level, the development process for a Fusion web application usually involves creating an application workspace. Using a wizard, libraries and configuration needed for technologies selected by a developer are automatically added and an application is structured into projects with packages and directories.

By modeling database objects, an online database or offline replica of any database can be created, definitions edited, and schemas updated. Using an UML modeler, use cases can then be created for the application. Application control and navigation can also be designed. Diagrammers can be used to visually determine the flow of application control and navigation. Then, an underlying XML file describing the flow can be automatically created. A resource library can be used to allow a developer to view and use imported libraries by simply dragging and dropping them into the application. From database tables, entity objects can be created using wizards or dialogs. From those entity objects, view objects are created to be used by pages in the application. Validation rules and other types of business logic can be implemented.

In this example, a business services layer manages interaction with a data persistence layer. It provides such services as data persistence, object/relational mapping, transaction management, and business logic execution. The business services layer can be implemented in any of the following options: as simple Java classes, EJB, Web services, JPA objects, and Oracle ADF Business Components. In addition, data can be consumed directly from files (XML or CSV) as well as REST. Thus, each business service manages interaction with a corresponding data persistence layer, and also provides such services as object/relational mapping, transaction management, business logic execution, etc. The business services layer may be implemented using one or more of simple Java classes, Enterprise Java Beans, web services, etc.

Business components represent a business service implemented using, for example, Oracle ADF Business Components, to provide interaction with databases, web services, legacy systems, application servers, and the like. In one embodiment, business components of the business services layer contain a mixture of application modules, view/query objects, and entity objects, which cooperate to provide the business service implementation. An application module can be a transactional component/code module that UI clients communicate with for working with application/transaction data. The application module may provide an updatable data model and also procedures/functions (commonly referred to as service methods) related to user transactions.

An entity object may represent a corresponding row in a database table and simplifies the manipulation (update, deletion, etc.) of the data stored in the corresponding row. An entity object often encapsulates business logic for the corresponding row to ensure that the desired business rules are consistently enforced. An entity object may also be associated with other entity objects to reflect relationships existing between rows stored in the underlying database.

JSON Stylesheet Language Transformation

Figure 2:
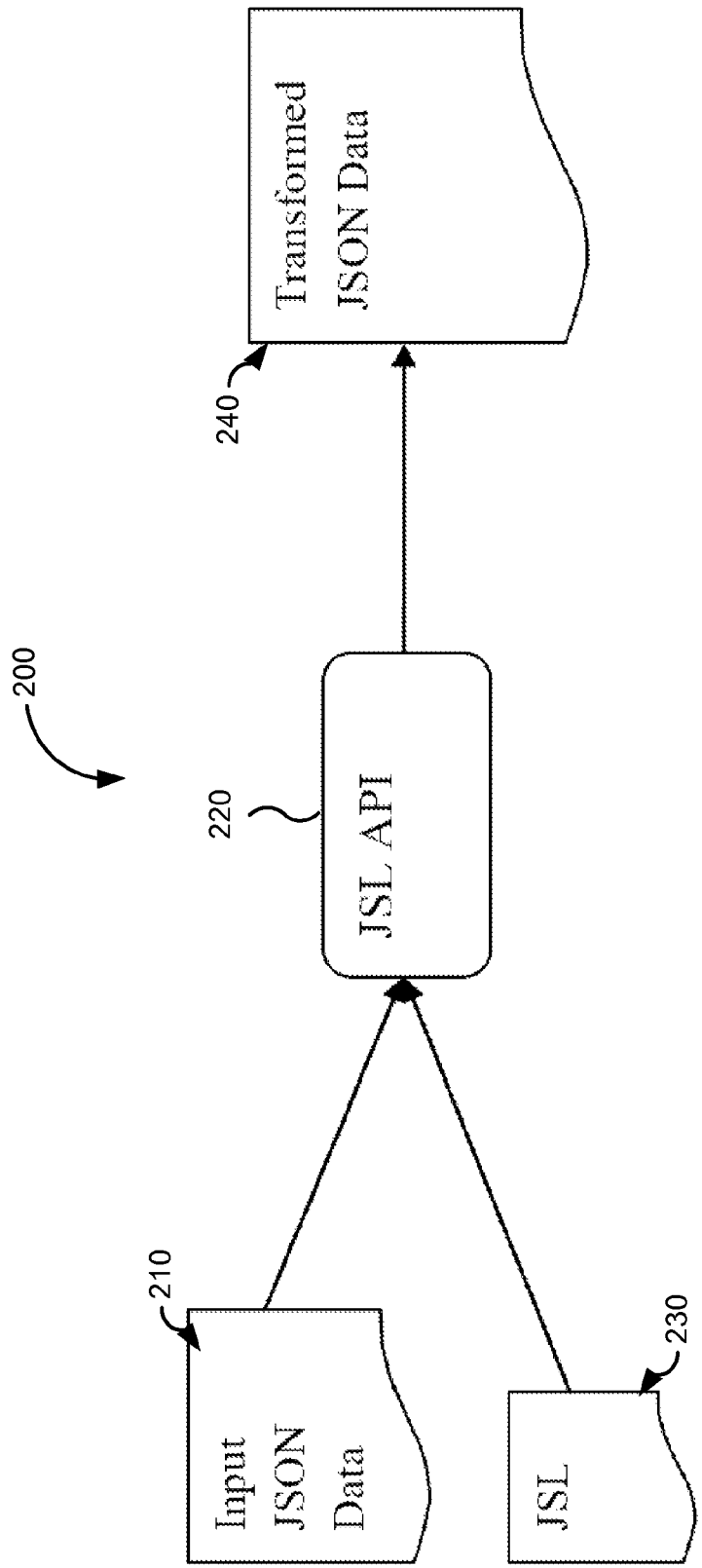
FIG. 2 is a simplified block diagram of a workflow for transforming JSON data in one embodiment.

FIG. 2 is a simplified block diagram of workflow 200 for transforming JSON data in one embodiment. In workflow 200, input JSON data 210 is received at JSL API 220. JSL 230 (also a JSON document) is received at JSL API 220. JSL API 220 generates transformed JSON data 240 based on input JSON data 210 and JSL 230.

In this exemplary embodiment, in general, input JSON data 210 is a JSON document that specifies the logical structure of an object or portion of data. The logical structure of input JSON data 210 may be defined according to one or more JSON schemas.

JSL 230 is also a JSON document. A processor (e.g., JSL API 220) can understand the JSL (JSON StyleSheet Language) of JSL 230 and apply one or more specified transformation on input JSON data 210. This is similar to XSLT which is used to apply transformations on XML. One of the major advantages of JSL is that users are not required to familiarize themselves with specifications of other languages. This is because JSL itself is written in JSON data format, similar to XSL defining XML transformations.

In the market, there are many transformation tools which transform JSON data. But most of these tools are written in a separate language which makes it difficult for the users to handle. For example, JsonT is a language for transforming JSON-like structures, analogous to XSLT in the XML world. This implementation is not as straightforward as JSL. In another example, json2json is written in CoffeeScript and designed to run in a Node.js environment. The disadvantage of this implementation is that the user must learn Coffee language to create the template file for the transformation. However, in JSL, the template which the user specifies for transformation is written in JSON.

In various embodiments, JSL 230 is defined according to a JSL Specification. JSL can contain keywords that configure the processor to implement a transformation of input JSON data 210. In one aspect, a "value" keyword is provided in the JSL file to instruct the processor how to represent the value for a specified key in input JSON data 210. The "value" keyword may be defined with a value. In one embodiment, the value can be a lexical string that indicates the lexical path of the key in input JSON data 210. This path can start with a "root" keyword (e.g., root.employee.id) where employee is an object and id is a string valued attribute.

In another embodiment, the value can be a text string that indicates any text defined between single quotes to be considered as the value. In yet another embodiment, the value can be an operational string that indicates a combination of lexical/text strings with arithmetic/string/logical operations defined on them. For example, "concat(root.employee.id, 'abc')" indicates that the value of the id field is to be concatenated with the string 'abc' when inserted into transformed JSON data 240.

In another aspect, a "type" keyword is provided in the JSL file to instruct the processor how to represent the data type of the value for the specific key. In various embodiments, the "type" keyword can be defined with a value. In certain embodiments, the value can be an integer, a string, a double, a Boolean, null, etc. For JSONArray elements, the value can be specified as an objectarray, <Primitive Data type>array— e.g. Stringarray etc.

In yet another aspect, a "source" keyword is provided in the JSL file to instruct the processor how to represent the lexical path of a parent of an entity. In various embodiments, the keyword is defined only for array elements. In a further aspect, a "testexpression" keyword is provided in the JSL file to instruct the processor how to evaluate input JSON data 210 with respect to one or more specified conditions. This keyword can be used to evaluate a expression based on which specific JSON object or JSON Array will be processed. The expression can return a Boolean value. At the object level, based on a "testexpression" result, a processor can decide whether an object is to be excluded or included in transformed JSON data 240. At the node level, based on a "testexpression" result, a processor can decide whether the node is to be excluded or included in transformed JSON data 240.

In certain embodiments, various transformation operations are supported. For example, string operations can include concatenate, compare, replace, substring etc. Arithmetic operations can include addition, multiplication, division, subtraction etc. Boolean operations can include true( ), false( ), not( ) etc.

Figure 3:
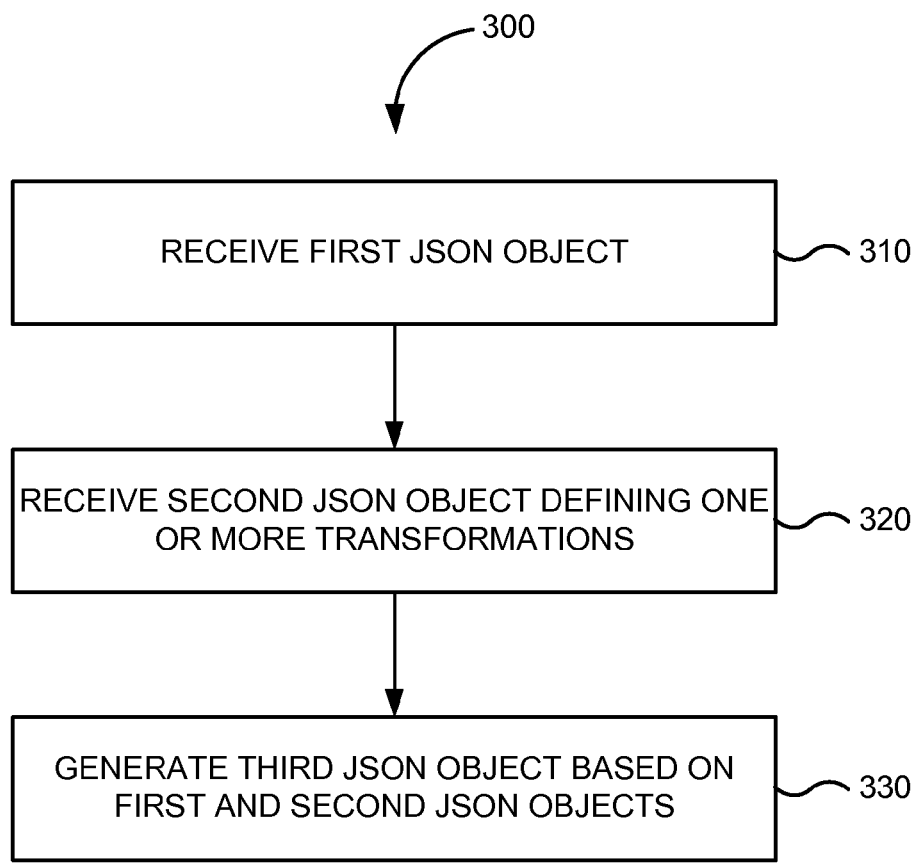
FIG. 3 is a flowchart of a method for performing JSON data transformations using JSON objects defining one or more transformations in one embodiment.

FIG. 3 is a flowchart of method 300 for performing JSON data transformations using JSON objects defining one or more transformations in one embodiment. Implementations of or processing in method 300 depicted in FIG. 3 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 300 depicted in FIG. 3 begins in step 310.

In step 310, a first JSON object is received. The first JSON object can be received as a serialized object in the form of a string. In step 320, a second JSON object is received defining one or more transformations. As discussed above, the second JSON object is written as other JSON data familiar to the user using one or more defined keywords that indicate transformations to a source object, source node, or filters to be applied thereto.

In step 330, a third JSON object is generated based on the first JSON object and the second JSON object. Accordingly, no transformation into any intermediate forms or languages is required. Additionally, the user is not required to learn a new language in order to define transformations.

Figure 4:
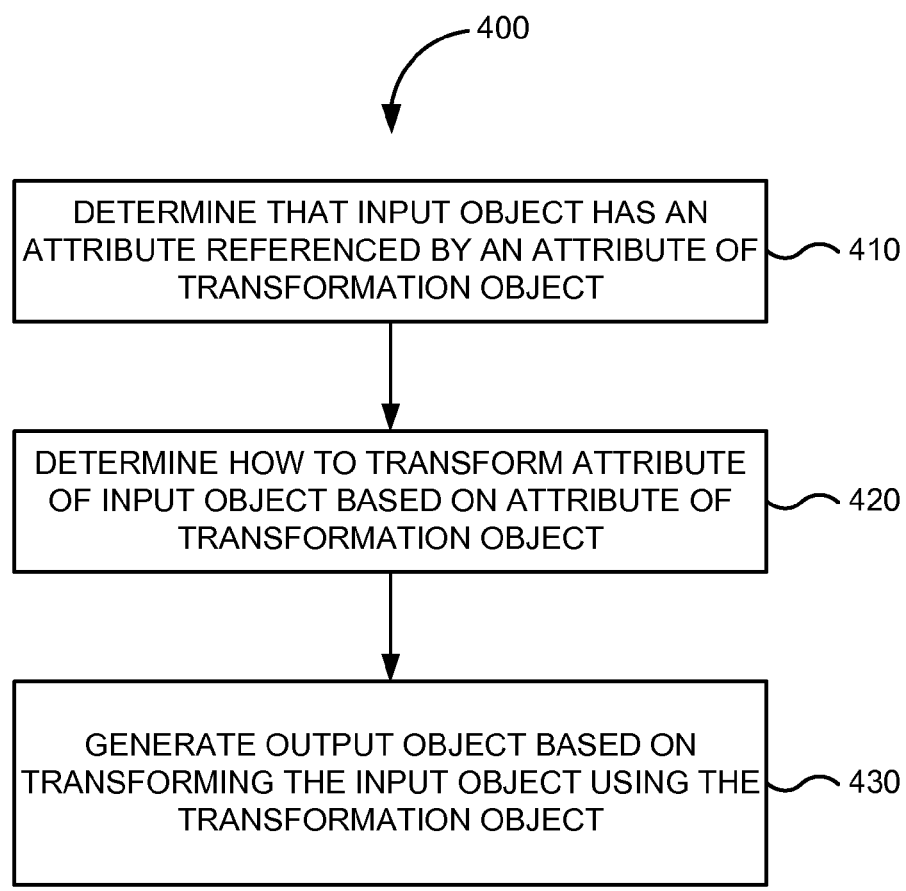
FIG. 4 is a flowchart of a method for determining how to transform a JSON data of one object using a JSON data attribute language of another object in one embodiment.

FIG. 4 is a flowchart of method 400 for determining how to transform JSON data of one object using a JSON data attribute language of another object in one embodiment. Implementations of or processing in method 400 depicted in FIG. 4 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 400 depicted in FIG. 4 begins in step 410.

In step 410, a determination is made that an input object has an attribute referenced by an attribute of a transformation object. In certain embodiment, a reference can be made by matching attribute names between the input object and the transformation object. Accordingly, the attribute of the input object may have the identical name as the attribute of the transformation object. In some embodiments, the attribute of the input object can be referenced by the value of the attribute of the transformation object. For example, the name keyword provided as a value of an attribute of the transformation object may be used to reference the name of the attribute of the input object.

In step 420, a determination is made how to transform the attribute of the input object based on the attribute of the transformation object. In certain embodiments, a determined transformation may include a renaming of the attribute of the input object, a modification to the value of the attribute of the input object, a determination whether to include the attribute of the input object in an output object, or the like.

In step 430, an output object is generated based on transforming the input object using the transformation object.

Figure 5:
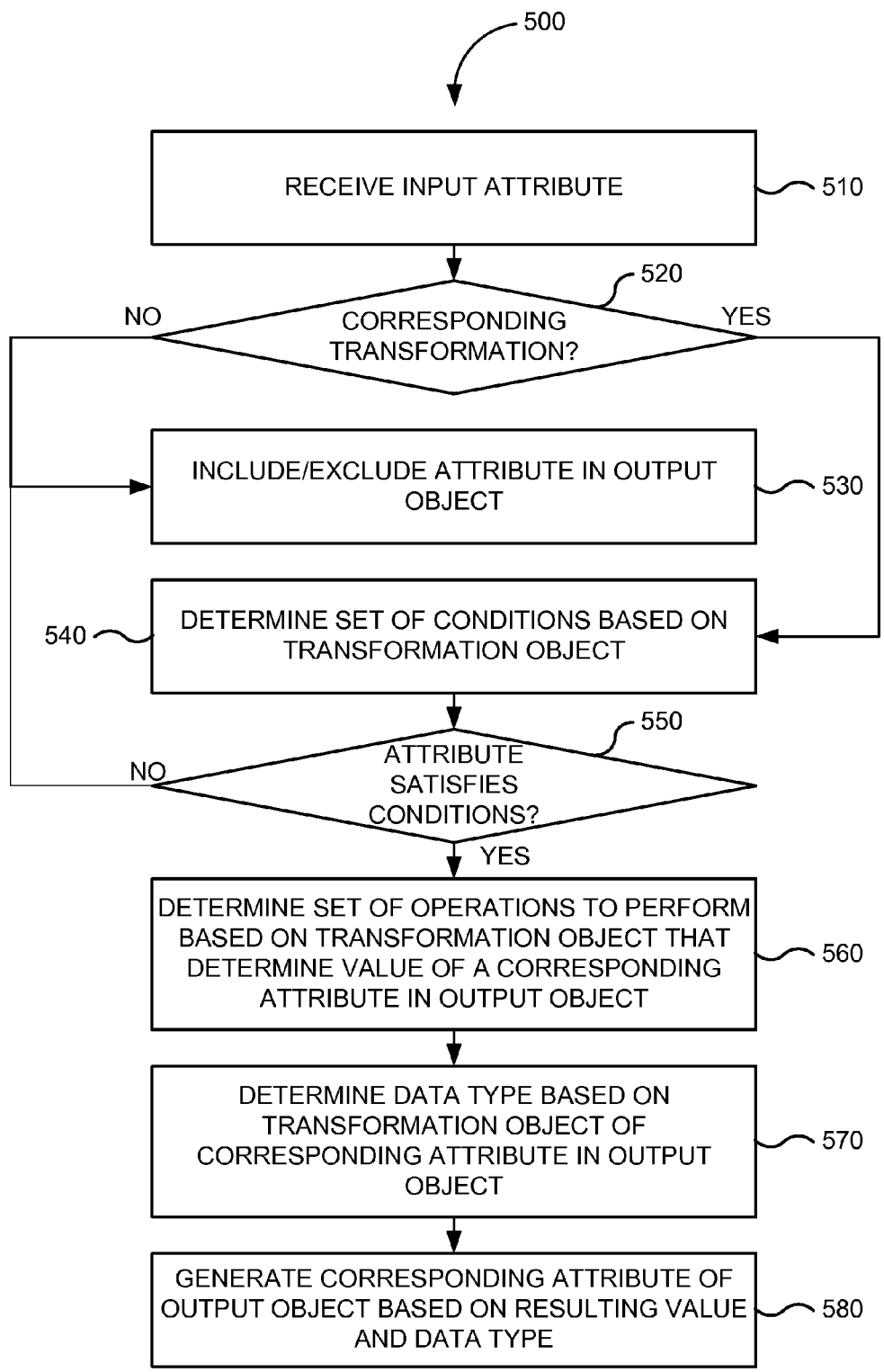
FIG. 5 is flowchart of a method for determining how to transform JSON data using JSON Stylesheet language in one embodiment.

FIG. 5 is flowchart of a method for determining how to transform JSON data using JSON Stylesheet language in one embodiment. Implementations of or processing in method 500 depicted in FIG. 5 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 500 depicted in FIG. 5 begins in step 510.

In step 510, an input attribute is received. The input attribute is represented by a key-value pair. The key provides the name of the attribute and the value can be one or more primitive data types or objects. In step 520, a determination is made whether there is a corresponding transformation of the input attribute. As discussed above, a corresponding transformation may be found by an attribute of a transformation object having the same name as the input attribute, by attribute of a transformation object having a reference to the input attribute, or the like.

If a determination is made that there is not a corresponding transformation of the input attribute, in step 530, a determination is made whether to include or exclude the input attribute in an output object. A rule may indicate that the absence of a transformation causes the attribute to flow as is to the output object. Another rule may indicate that the absence of a transformation causes the attribute to be filtered from the output object.

If a determination is made that there is a corresponding transformation of the input attribute, in step 540, a set of conditions is determined based on the transformation object. In various embodiments, a corresponding attribute of a transformation object may include an expression that defines the one or more conditions. A condition can express criteria that need to be satisfied in order for the condition to evaluate to true. The criteria can be expressed in terms of the name of the attribute, the value of the attribute, a combination thereof, or other conditions, rules, thresholds, limitations, or the like that need to be evaluated in order to determine whether they satisfy predetermined criteria.

In step 550, a determination is made whether the input attribute satisfies the determined criteria. The input attribute may be found to satisfy or not satisfy a null set of criteria. The input attribute may be found to satisfy or not satisfy a predetermined threshold, evaluation, calculation, set of operations, or the like. If a determination is made that the input attribute fails satisfies the determined criteria, in step 530, a determination is made whether to include or exclude the input attribute in an output object as discussed above.

If a determination is made that the input attribute satisfies the determined criteria, in step 560, a set of operations to perform is determined based on the transformation object that determine a value of a corresponding attribute in the output object. In certain embodiments, a determined set of operations may include renaming of the attribute of the input object, modification to the value of the attribute of the input object, a determination whether to include all or part of the value of the attribute of the input object in the output object, or the like.

In step 570, a data type is determined based on the transformation object for the corresponding attribute in the output object. The data type may be explicitly defined by the transformation object, inferred from the input object, determined based on results of performing the set of operations, or the like. As discussed above, the determined data type can include a fundamental JSON object data type.

In step 580, the corresponding attribute of the output object is generated based on a resulting value of performing the set of operations and the determined data type. In certain embodiments, a null set of operations may cause the value of the input attribute to flow through to the corresponding attribute of the output object. In other embodiments, the set of operations can rename the value, calculate a new value, modify the value, or the like.

Figure 6:
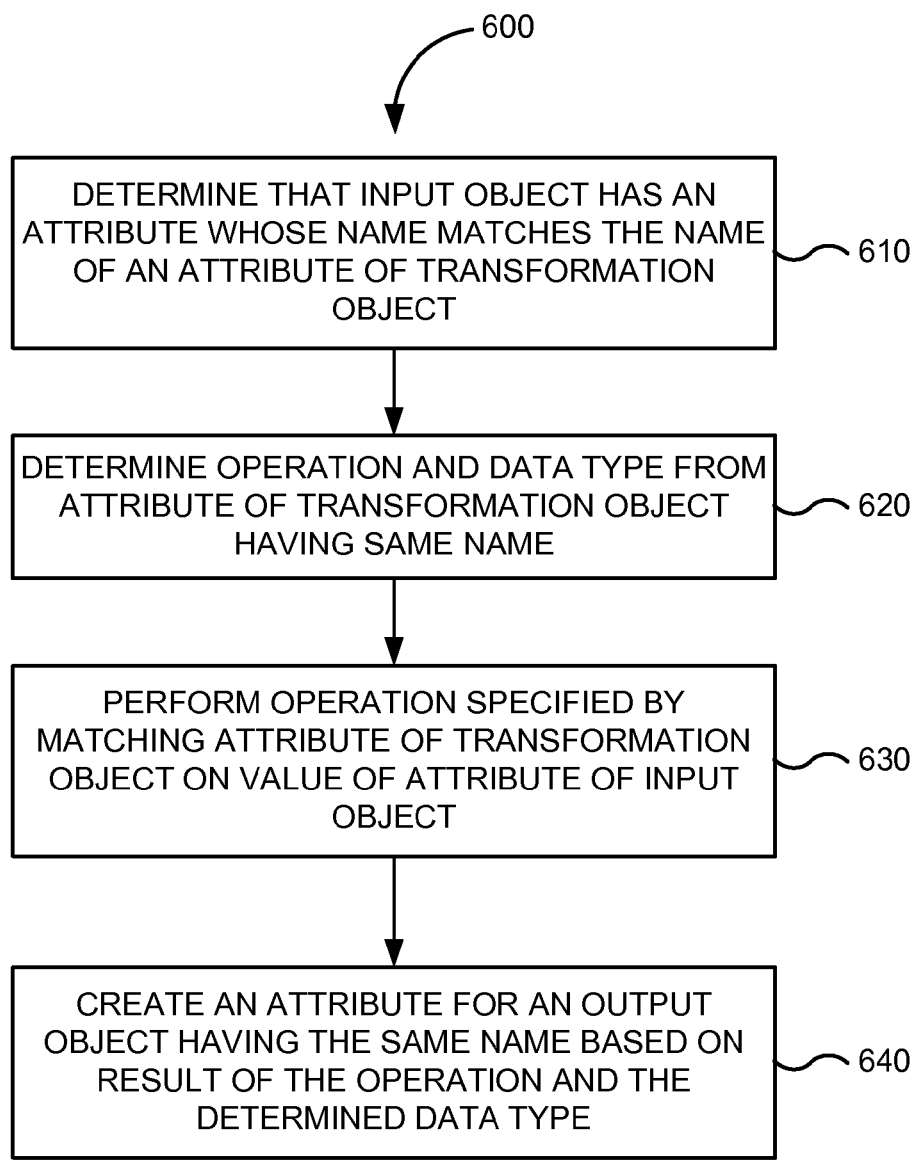
FIG. 6 is a flowchart of a method for transforming JSON data attributes having the same name as attributes of JSON Stylesheet language objects in one embodiment.

FIG. 6 is a flowchart of method 600 for transforming JSON data attributes having the same name as attributes of JSON Stylesheet language objects in one embodiment. Implementations of or processing in method 600 depicted in FIG. 6 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 600 depicted in FIG. 6 begins in step 610.

Figure 7:
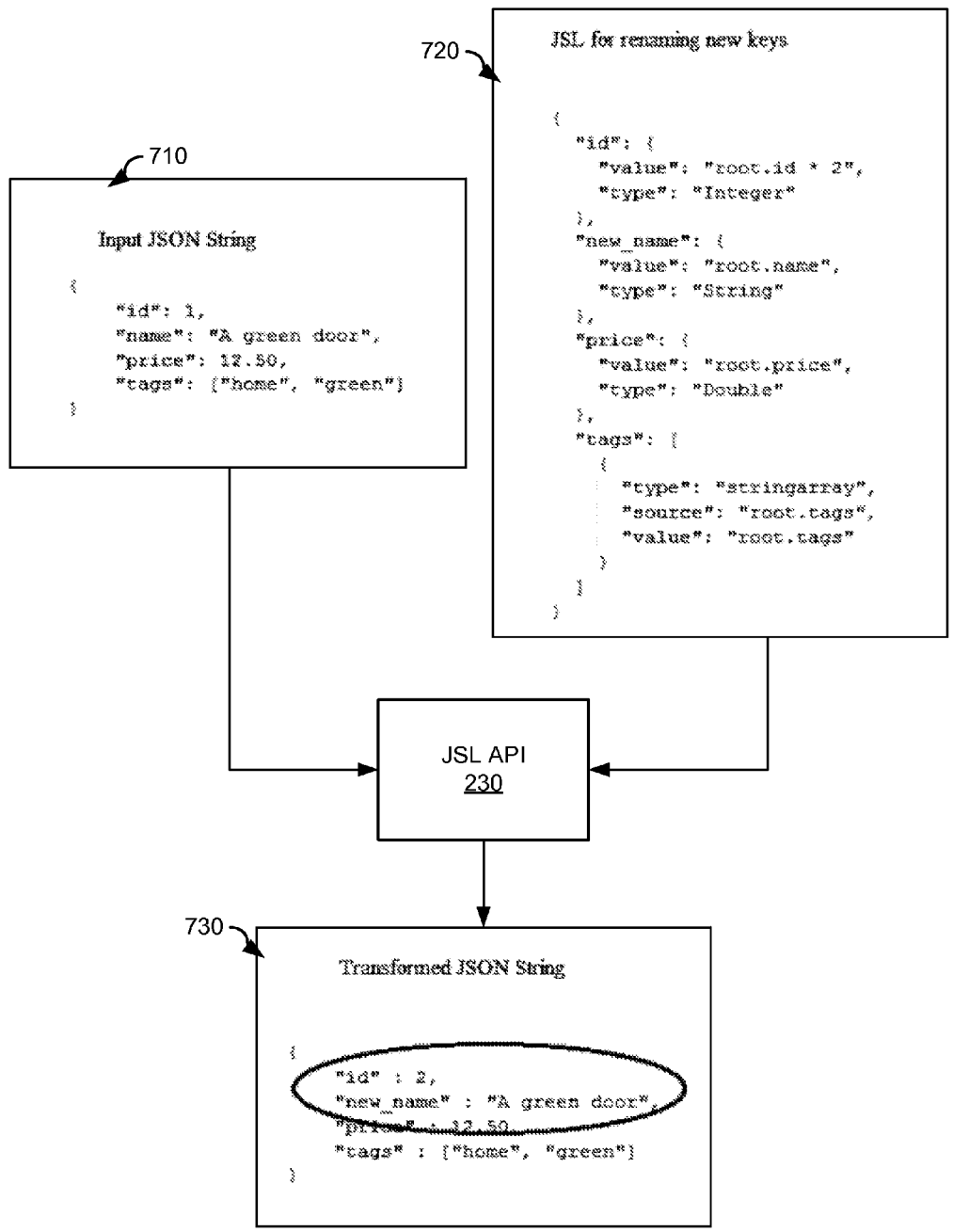
FIG. 7 is an illustration of an input JSON string, a JSL string, and an output string resulting from transformation of attributes of the input JSON string using the JSL string in one embodiment.

In step 610, a determination is made that an input object has an attribute whose name matches the name of an attribute of a transformation object. FIG. 7 is an illustration of input JSON string 710, JSL string 720, and output JSON string 730 resulting from transformation of attributes of input JSON 710 string using JSL string 720 in one embodiment. As illustrated, both input JSON string 710 and JSL string 720 have an attribute by the name "id."

In step 620, a determination is made as to an operation and data type from the attribute of the transformation object having the same name. Referring to FIG. 7, attribute "id" of JSL string 720 specifies how to transform the "id" attribute of input JSON string 710 using the expression "root.id*2." In other words, the value of the "id" attribute of input JSON string 710 is to be multiplied by 2. Attribute "id" of JSL string 720 further specifies that the value resulting from the expression "root.id*2" is to be an Integer.

In step 630, the determined operation specified by the matching attribute of the transformation object is performed on the value of the attribute of the input object. In step 640, an attribute for an output object is created having the same name based on result of the operation and the determined data type. As illustrated in FIG. 7, output JSON string 730 includes an "id" attribute having the value determined using the expression "root.id*2." The data type of the "id" attribute of output JSON string 730 is Integer.

Figure 8:
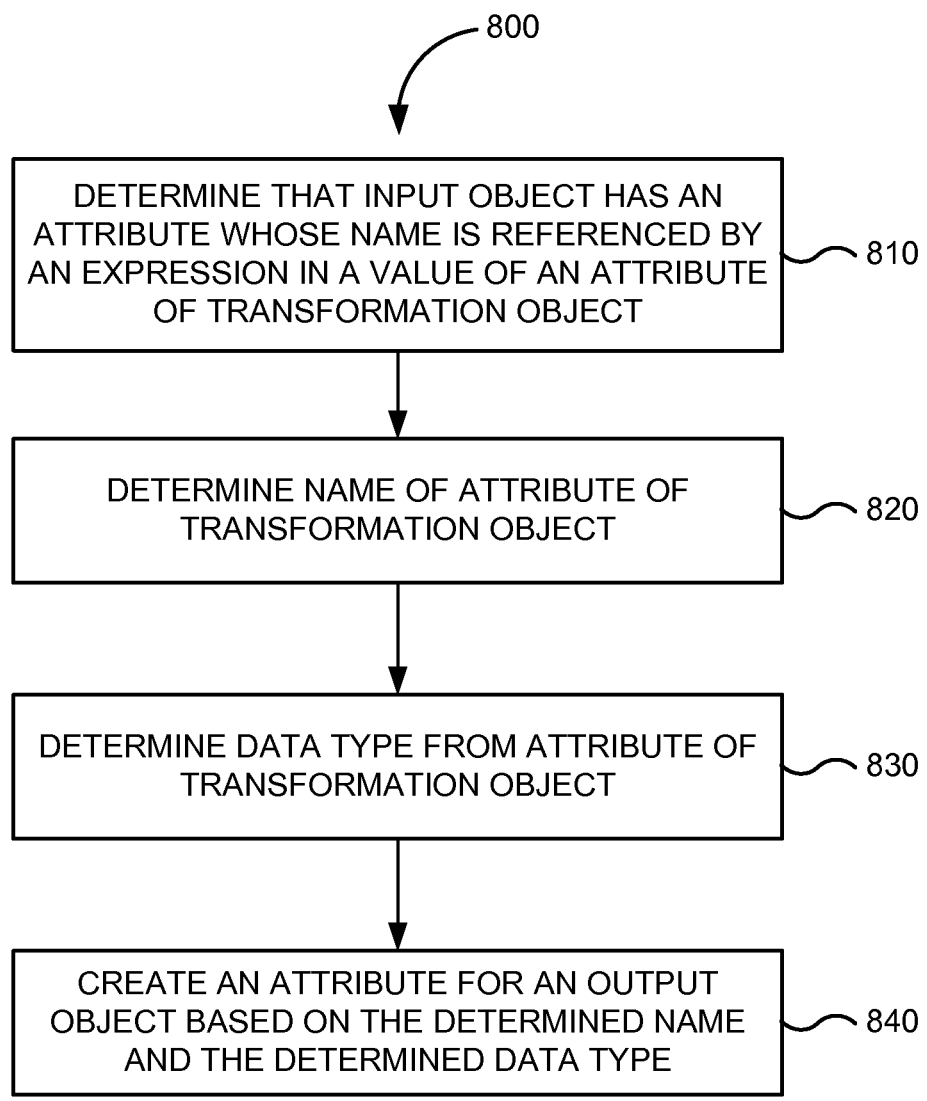
FIG. 8 is a flowchart of a method for transforming JSON data attributes referenced by attributes of JSON Stylesheet language objects in one embodiment.

FIG. 8 is a flowchart of method 800 for transforming JSON data attributes referenced by attributes of JSON Stylesheet language objects in one embodiment. Implementations of or processing in method 800 depicted in FIG. 8 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 800 depicted in FIG. 8 begins in step 810.

In step 810, a determination is made that an input object has an attribute whose name is referenced by an attribute of a transformation object. As illustrated in FIG. 7, input JSON string 710 has an attribute by the name "name" and JSL string 720 has an attribute by the name "new_name" that references the attribute by the name "name" of input JSON string 710 by an expression it is value (e.g., "value": "root.name").

In step 820, a determination is made as to an attribute name from the attribute of the transformation object. In step 830, a determination is made as to a data type from the attribute of the transformation object. In step 840, an attribute for an output object is created having the determined name and the determined data type. As illustrated in FIG. 7, output JSON string 730 includes a "new_name" attribute having the same value (e.g., "A green door") and data type (e.g., String) of the "name" attribute of input JSON string 710.

Figure 9:
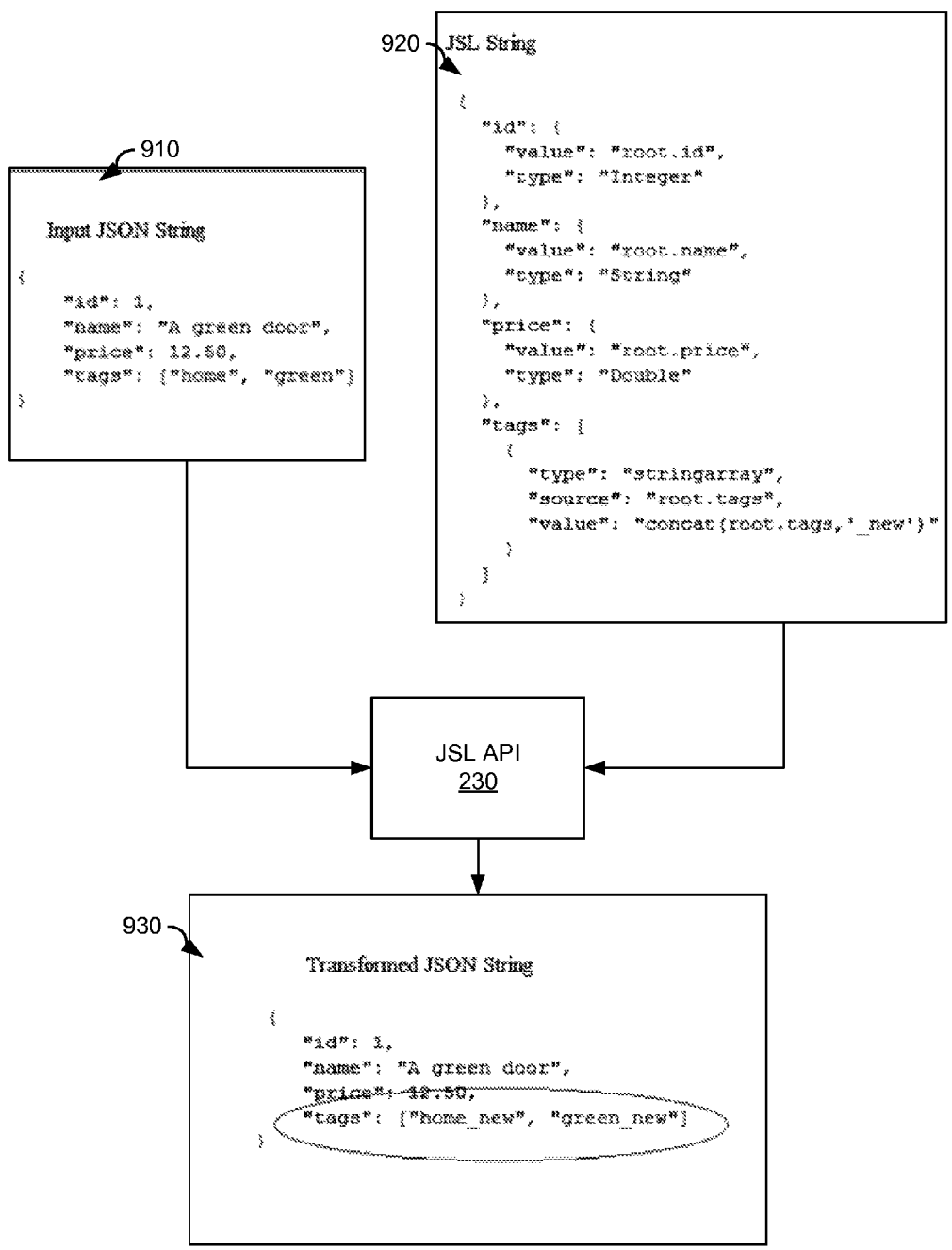
FIG. 9 is an illustration of an input JSON string, a JSL string, and an output string resulting from transformation of attribute values of the input JSON string using the JSL string in one embodiment.

FIG. 9 is an illustration of input JSON string 910, JSL string 920, and output JSON string 930 resulting from a transformation of attribute values of input JSON string 910 using JSL string 920 in one embodiment. In this example, input JSON string 910 and JSL string 920 have a matching attribute "tags." JSL string 920 specifies a transformation not of the attribute name as illustrated above, but of the value of the corresponding attribute. A string operations "concat (root.tags, '_new')" has been specified to add the suffix "_new" to each element in the "tags" array. Accordingly, output JSON string 930 includes an attribute named "tags" where each element of the array has the "_new" suffix added.

Figure 10:
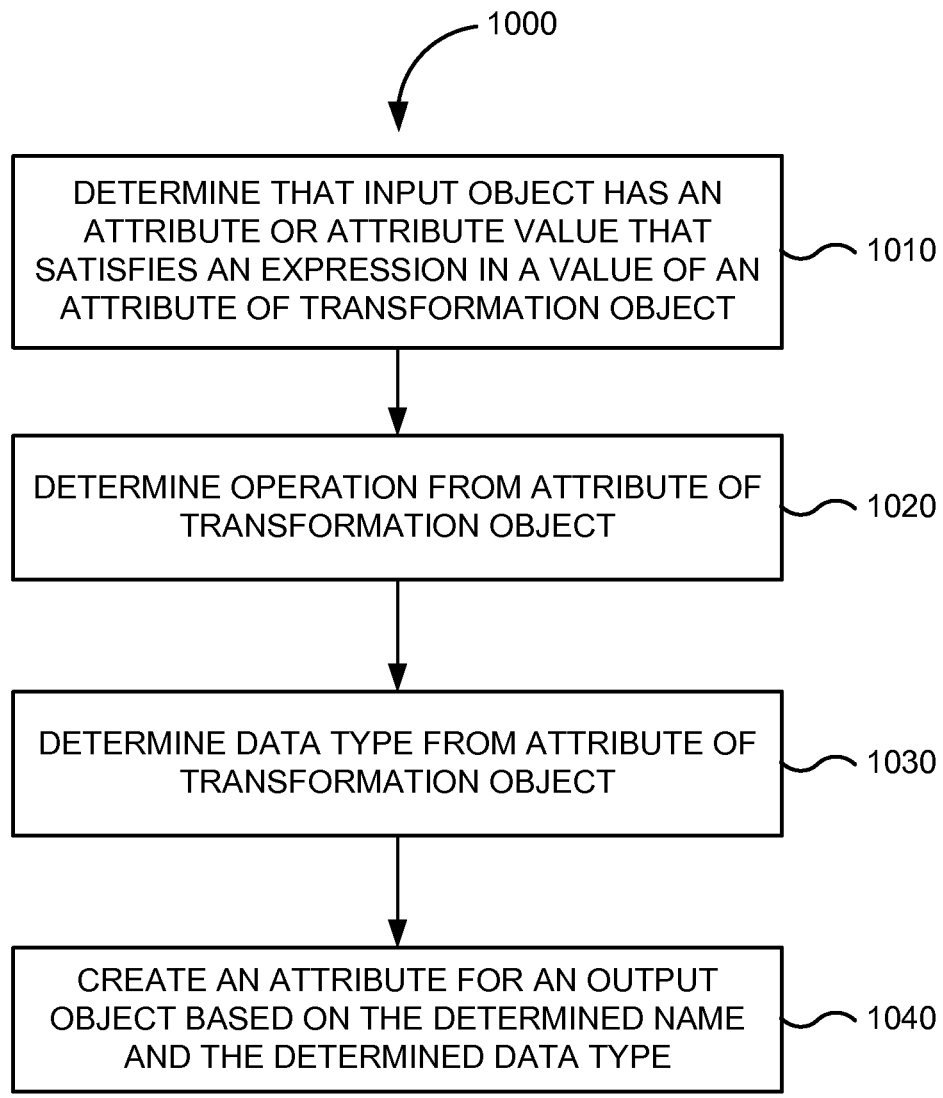
FIG. 10 is a flowchart of a method for transforming JSON data attributes that satisfy expressions of attributes of JSON Stylesheet language objects in one embodiment.

FIG. 10 is a flowchart of method 1000 for transforming JSON data attributes that satisfy expressions of attributes of JSON Stylesheet language objects in one embodiment. Implementations of or processing in method 1000 depicted in FIG. 10 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 1000 depicted in FIG. 10 begins in step 1010.

Figure 11:
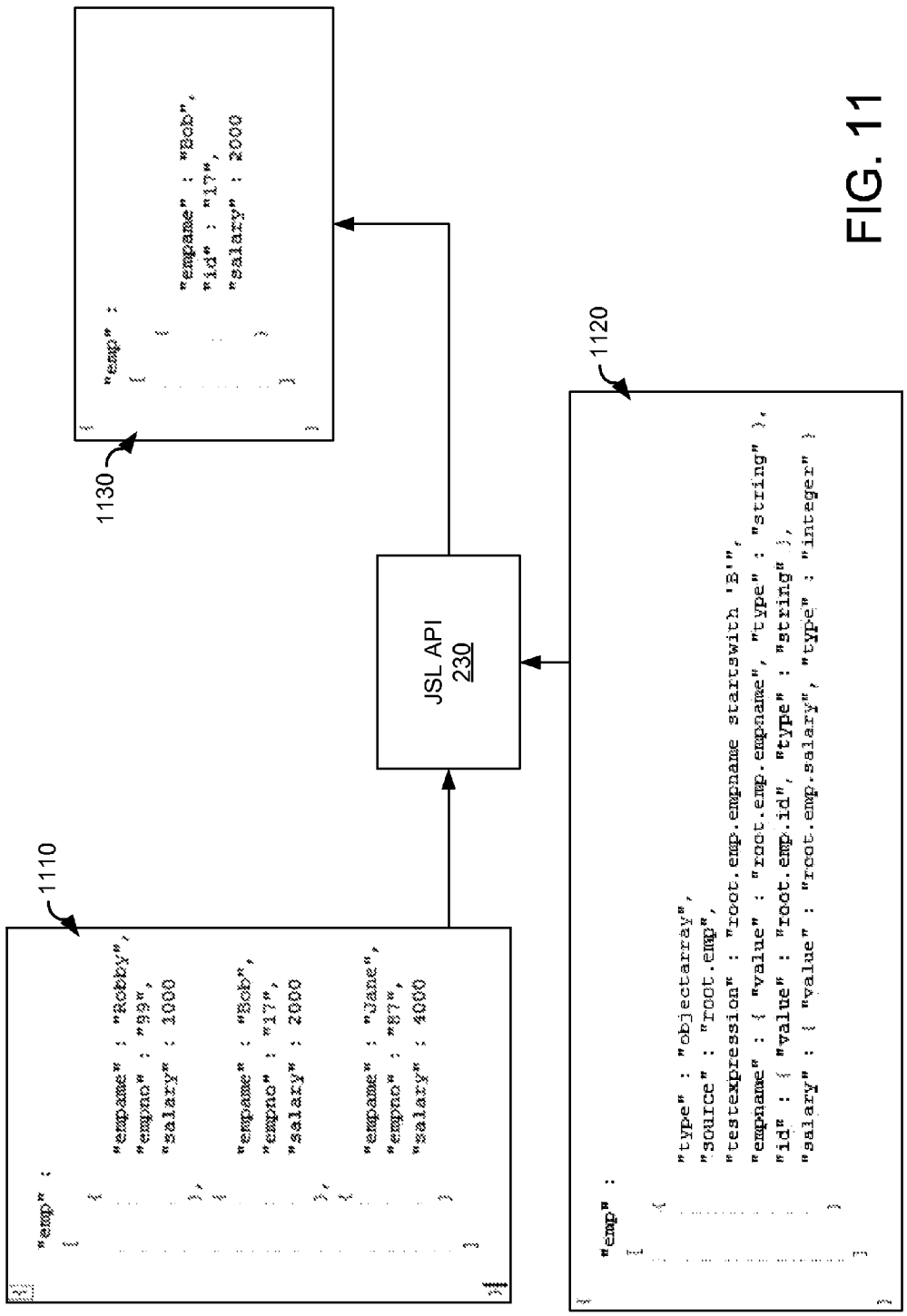
FIG. 11 is an illustration of an input JSON string, a JSL string, and an output string resulting from transformation of the input JSON string using the JSL string when an expression is satisfied in one embodiment.

In step 1010, a determination is made that an input object has an attribute or attribute value that satisfies an expression of an attribute of a transformation object. The expression can be specified in the value of an attribute of the transformation object having the same name, one referencing the name of the input attribute, or referencing the value of the input attribute. FIG. 11 is an illustration of input JSON string 1110, JSL string 1120, and output JSON string 1130 resulting from transformation of input JSON string 1110 using JSL string 1120 when an expression is satisfied in one embodiment. As illustrated, input JSON string 1110 has an attribute by the name "emp" and JSL string 1120 has an attribute by the name "emp." The attribute by the name "emp" of JSL string 1120 includes an expression in "testexpression" that is satisfied by objects whose empname starts with "B." Therefore, only one object in the "emp" array satisfies the condition, (e.g., "empname": "Bob").

In step 1020, a determination is made as to an operation from the attribute of the transformation object. Referring to FIG. 11, attribute "emp" of JSL string 1120 specifies how to transform each object of the "emp" attribute of input JSON string 1110 that satisfies the "textexpression." In step 1030, a determination is made as to a data type from the attribute of the transformation object. In step 1040, an attribute for an output object is created based on result of the operation and the determined data type. As illustrated in FIG. 11, output JSON string 1130 includes an "emp" attribute having a single object with "empname": "Bob." Accordingly, conditions can be specified that filter out attributes or attribute values leaving only the desired ones in the output object.

Figure 12:
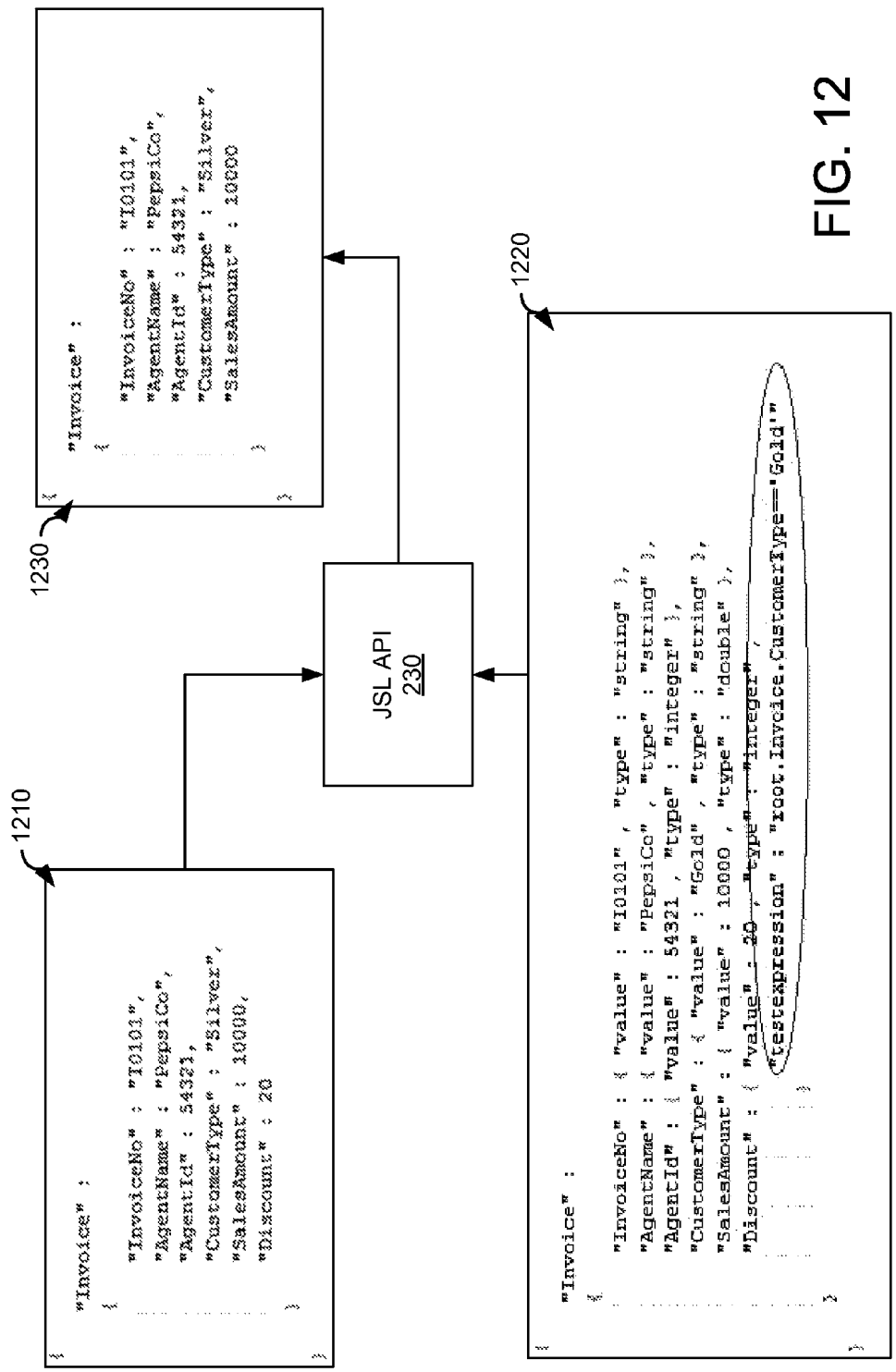
FIG. 12 is an illustration of an input JSON string, a JSL string, and an output string resulting from transformation of the input JSON string using the JSL string when an expression is satisfied in one embodiment.

FIG. 12 is an illustration of input JSON string 1210, JSL string 1220, and output JSON string 1230 resulting from transformation of input JSON string 1210 using JSL string 1220 when an expression is satisfied in one embodiment. In this example, an non-desired attributes or attribute values are filtered out. Accordingly, "textexpression" removes the "Discount": 20 attribute from the object because the CustomerType is not "Gold" but is "Silver."

Figure 13:
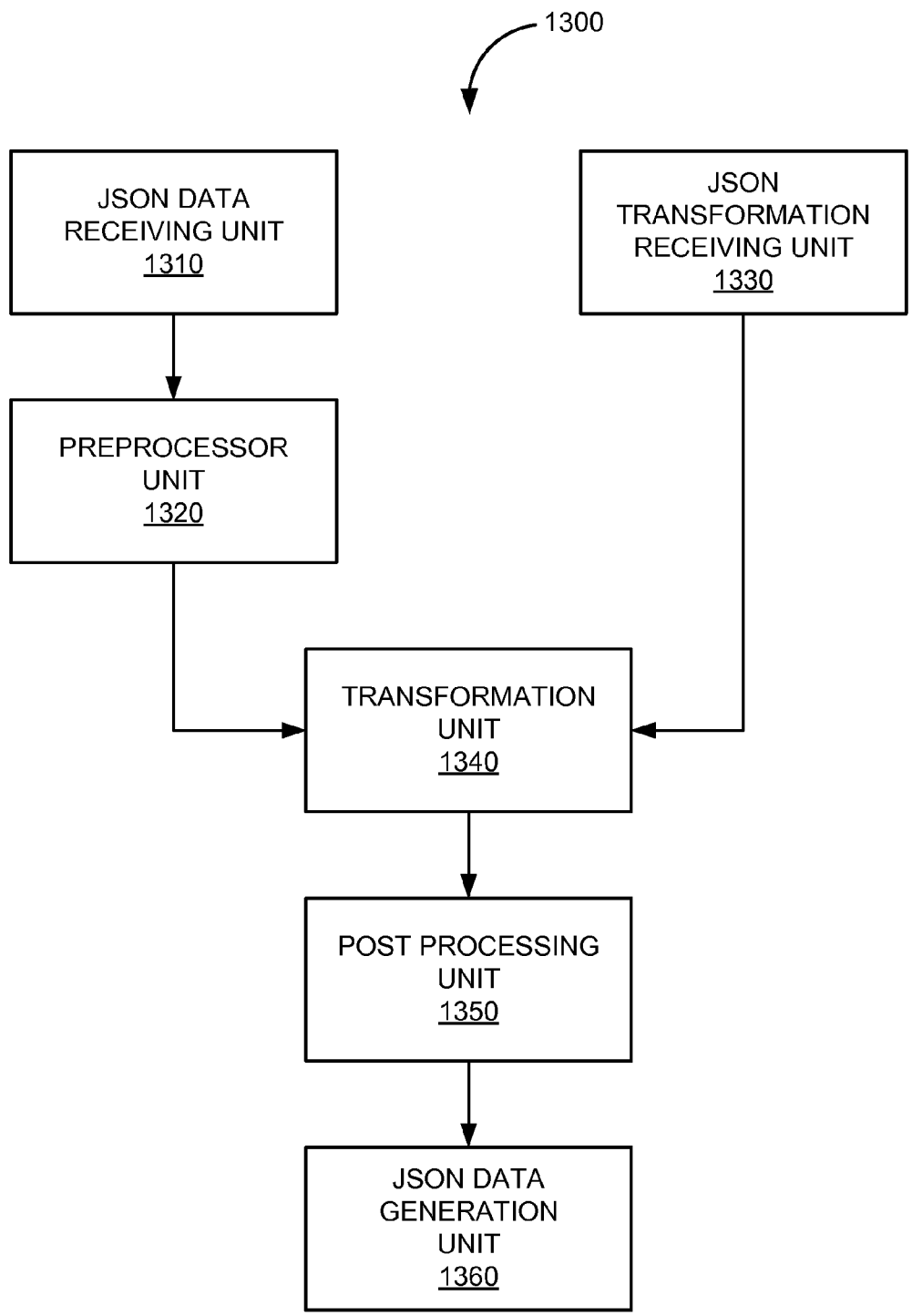
FIG. 13 is a block diagram of hardware units that are configured to perform JSON object transformations using JSON Stylesheet language objects in one embodiment.

FIG. 13 is a block diagram of hardware units 1300 that are configured to perform JSON object transformations using JSON Stylesheet language objects in one embodiment. Hardware units 1300 include JSON data receiving unit 1310, preprocessor unit 1320, JSON transformation receiving unit 1330, transformation unit 1340, post processing unit 1350, and JSON data generation unit 1360. Each unit may be implemented by a computer processor according to computer-executable code storing in a memory.

JSON data receiving unit 1310 includes hardware and/or software elements that receive JSON data. JSON data receiving unit 1310 can receive JSON data from user input or other computer processes. Preprocessor unit 1320 includes hardware and/or software elements that preprocess JSON data. One or more preprocessing steps may include data manipulation operations, data filtering operations, data augmentation operations, or the like. JSON transformation receiving unit 1330 includes hardware and/or software elements that receive JSON data. JSON transformation receiving unit 1330 can receive JSON data from user input or other computer processes. In this example, the JSON data received at JSON transformation receiving unit 1330 is formatted according to the JSL specification discussed above.

Transformation unit 1340 includes hardware and/or software elements that receives JSON data in the form object JSON objects and JSL transformations and applied any specified transformations. Transformation unit 1340 does not require any intermediate languages, such as XML, to implement the transformations.

Post processing unit 1350 includes hardware and/or software elements that process JSON data. One or more processing steps may include data manipulation operations, data filtering operations, data augmentation operations, or the like. JSON data generation unit 1360 includes hardware and/or software elements that generate JSON data. While multiple units have been illustrated, it will be understood that not all are required and some functions performed by some units can be incorporated into the other units.

CONCLUSION

Figure 14:
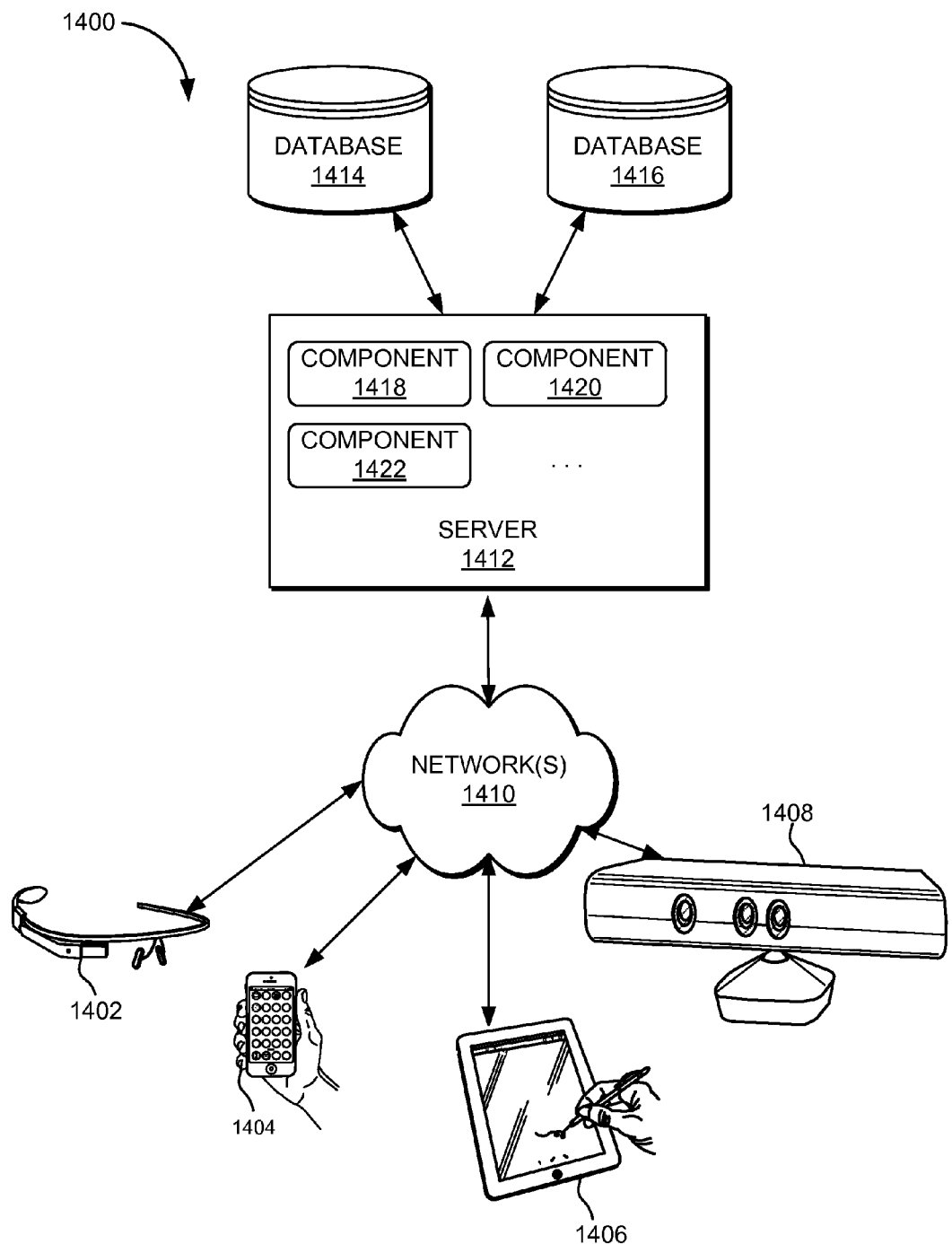
FIG. 14 depicts a simplified diagram of a distributed system for implementing one of the embodiments.

FIG. 14 depicts a simplified diagram of distributed system 1400 for implementing one of the embodiments. In the illustrated embodiment, distributed system 1400 includes one or more client computing devices 1402, 1404, 1406, and 1408, which are configured to execute and operate a client application such as a web browser, proprietary client (e.g., Oracle Forms), or the like over one or more network(s) 1410. Server 1412 may be communicatively coupled with remote client computing devices 1402, 1404, 1406, and 1408 via network 1410.

In various embodiments, server 1412 may be adapted to run one or more services or software applications provided by one or more of the components of the system. In some embodiments, these services may be offered as web-based or cloud services or under a Software as a Service (SaaS) model or a Platform as a Serves (PaaS) model to the users of client computing devices 1402, 1404, 1406, and/or 1408. Users operating client computing devices 1402, 1404, 1406, and/or 1408 may in turn utilize one or more client applications to interact with server 1412 to utilize the services provided by these components.

In the configuration depicted in FIG. 14, software components 1418, 1420, and 1422 of system 1400 are shown as being implemented on server 1412. In other embodiments, one or more of the components of system 1400 and/or the services provided by these components may also be implemented by one or more of the client computing devices 1402, 1404, 1406, and/or 1408. Users operating the client computing devices may then utilize one or more client applications to use the services provided by these components. These components may be implemented in hardware, firmware, software, or combinations thereof. It should be appreciated that various different system configurations are possible, which may be different from distributed system 1400. The embodiment shown in the figure is thus one example of a distributed system for implementing an embodiment system and is not intended to be limiting.

Client computing devices 1402, 1404, 1406, and/or 1408 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. Client computing devices 1402, 1404, 1406, and/or 1408 can be general purpose personal computers including, by way of example, personal computers and/or laptop computers running various versions of Microsoft Windows®, Apple Macintosh®, and/or Linux operating systems. Client computing devices 1402, 1404, 1406, and/or 1408 can be workstation computers running any of a variety of commercially-available UNIX® or UNIX-like operating systems, including without limitation the variety of GNU/Linux operating systems, such as for example, Google Chrome OS. Alternatively, or in addition, client computing devices 1402, 1404, 1406, and 1408 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1410.

Although exemplary distributed system 1400 is shown with four client computing devices, any number of client computing devices may be supported. Other devices, such as devices with sensors, etc., may interact with server 1412.

Network(s) 1410 in distributed system 1400 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1410 can be a local area network (LAN), such as one based on Ethernet, Token-Ring and/or the like. Network(s) 1410 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1412 may be composed of one or more general purpose computers, specialized server computers (including, by way of example, PC (personal computer) servers, UNIXO servers, mid-range servers, mainframe computers, rack-mounted servers, etc.), server farms, server clusters, or any other appropriate arrangement and/or combination. In various embodiments, server 1412 may be adapted to run one or more services or software applications described in the foregoing disclosure. For example, server 1412 may correspond to a server for performing processing described above according to an embodiment of the present disclosure.

Server 1412 may run an operating system including any of those discussed above, as well as any commercially available server operating system. Server 1412 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1412 may include one or more applications to analyze and consolidate data feeds and/or event updates received from users of client computing devices 1402, 1404, 1406, and 1408. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1412 may also include one or more applications to display the data feeds and/or real-time events via one or more display devices of client computing devices 1402, 1404, 1406, and 1408.

Distributed system 1400 may also include one or more databases 1414 and 1416. Databases 1414 and 1416 may reside in a variety of locations. By way of example, one or more of databases 1414 and 1416 may reside on a non-transitory storage medium local to (and/or resident in) server 1412. Alternatively, databases 1414 and 1416 may be remote from server 1412 and in communication with server 1412 via a network-based or dedicated connection. In one set of embodiments, databases 1414 and 1416 may reside in a storage-area network (SAN). Similarly, any necessary files for performing the functions attributed to server 1412 may be stored locally on server 1412 and/or remotely, as appropriate. In one set of embodiments, databases 1414 and 1416 may include relational databases, such as databases provided by Oracle, that are adapted to store, update, and retrieve data in response to SQL-formatted commands.

Figure 15:
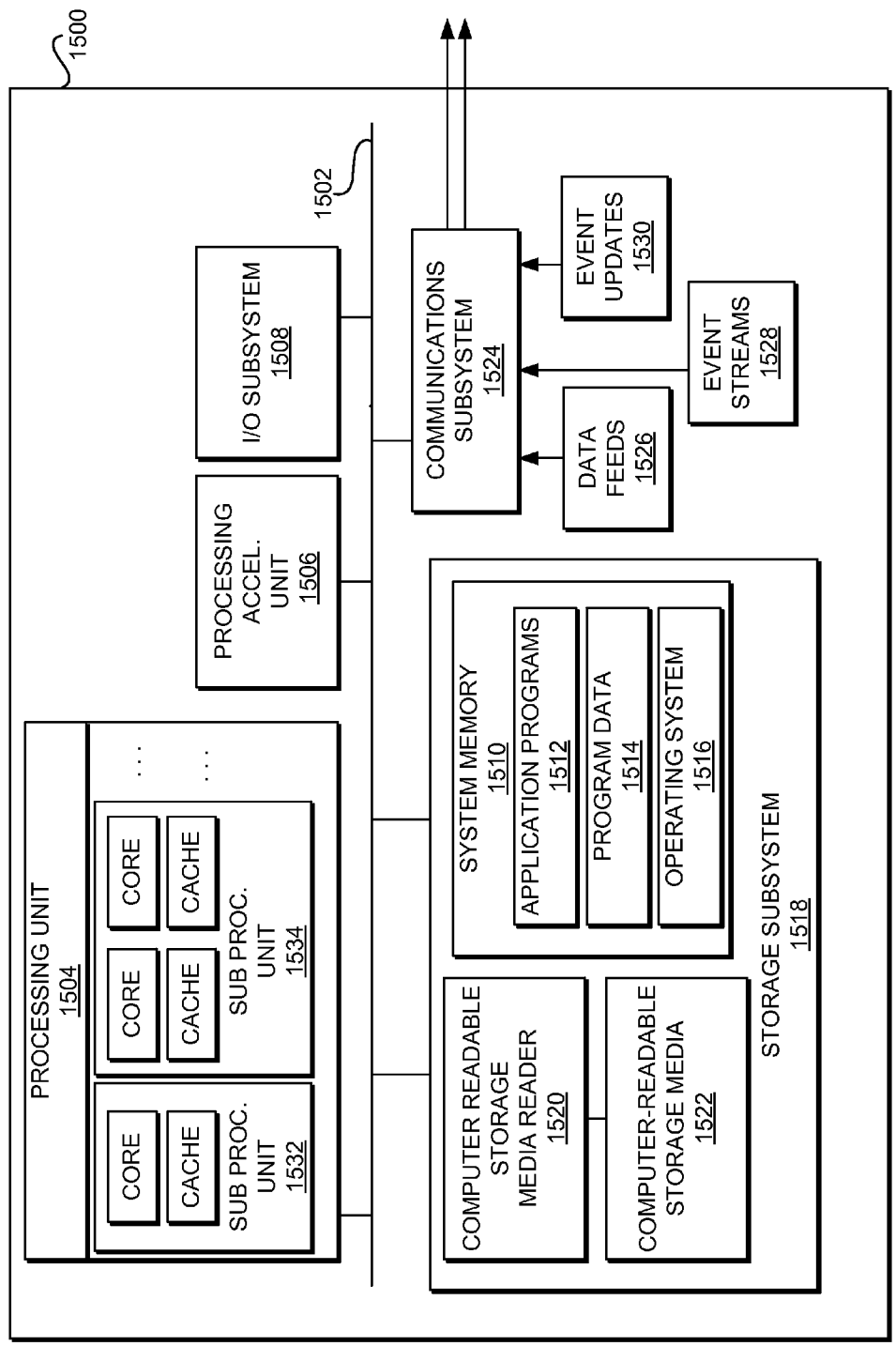
FIG. 15 illustrates an exemplary computer system, in which various embodiments of the present invention may be implemented.

FIG. 15 illustrates an exemplary computer system 1500, in which various embodiments of the present invention may be implemented. The system 1500 may be used to implement any of the computer systems described above. As shown in FIG. 15, computer system 1500 includes bus subsystem 1502 and processing unit 1504 that communicates with a number of peripheral subsystems via bus subsystem 1502. These peripheral subsystems may include processing acceleration unit 1506, I/O subsystem 1508, storage subsystem 1518, and communications subsystem 1524. Storage subsystem 1518 includes tangible computer-readable storage media 1522 and a system memory 1510.

Bus subsystem 1502 provides a mechanism for letting the various components and subsystems of computer system 1500 communicate with each other as intended. Although bus subsystem 1502 is shown schematically as a single bus, alternative embodiments of the bus subsystem may utilize multiple buses. Bus subsystem 1502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1504, which can be implemented as one or more integrated circuits (e.g., a conventional microprocessor or microcontroller), controls the operation of computer system 1500. One or more processors may be included in processing unit 1504. These processors may include single core or multicore processors. In certain embodiments, processing unit 1504 may be implemented as one or more independent processing units 1532 and/or 1534 with single or multicore processors included in each processing unit. In other embodiments, processing unit 1504 may also be implemented as a quad-core processing unit formed by integrating two dual-core processors into a single chip.

In various embodiments, processing unit 1504 can execute a variety of programs in response to program code and can maintain multiple concurrently executing programs or processes. At any given time, some or all of the program code to be executed can be resident in processor(s) 1504 and/or in storage subsystem 1518. Through suitable programming, processor(s) 1504 can provide various functionalities described above. Computer system 1500 may additionally include a processing acceleration unit 1506, which can include a digital signal processor (DSP), a special-purpose processor, and/or the like.

I/O subsystem 1508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1500 may comprise a storage subsystem 1518 that comprises software elements, shown as being currently located within a system memory 1510. System memory 1510 may store program instructions that are loadable and executable on processing unit 1504, as well as data generated during the execution of these programs.

Depending on the configuration and type of computer system 1500, system memory 1510 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1504. In some implementations, system memory 1510 may include multiple different types of memory, such as static random access memory (SRAM) or dynamic random access memory (DRAM). In some implementations, a basic input/output system (BIOS), containing the basic routines that help to transfer information between elements within computer system 1500, such as during start-up, may typically be stored in the ROM. By way of example, and not limitation, system memory 1510 also illustrates application programs 1512, which may include client applications, Web browsers, mid-tier applications, relational database management systems (RDBMS), etc., program data 1514, and an operating system 1516. By way of example, operating system 1516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1518 may also provide a tangible computer-readable storage medium for storing the basic programming and data constructs that provide the functionality of some embodiments. Software (programs, code modules, instructions) that when executed by a processor provide the functionality described above may be stored in storage subsystem 1518. These software modules or instructions may be executed by processing unit 1504. Storage subsystem 1518 may also provide a repository for storing data used in accordance with the present invention.

Storage subsystem 1500 may also include a computer-readable storage media reader 1520 that can further be connected to computer-readable storage media 1522. Together and, optionally, in combination with system memory 1510, computer-readable storage media 1522 may comprehensively represent remote, local, fixed, and/or removable storage devices plus storage media for temporarily and/or more permanently containing, storing, transmitting, and retrieving computer-readable information.

Computer-readable storage media 1522 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1500.

By way of example, computer-readable storage media 1522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1522 may include, but is not limited to, Zip® drives, flash memory cards, universal serial bus (USB) flash drives, secure digital (SD) cards, DVD disks, digital video tape, and the like. Computer-readable storage media 1522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1500.

Communications subsystem 1524 provides an interface to other computer systems and networks. Communications subsystem 1524 serves as an interface for receiving data from and transmitting data to other systems from computer system 1500. For example, communications subsystem 1524 may enable computer system 1500 to connect to one or more devices via the Internet. In some embodiments communications subsystem 1524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1524 can provide wired network connectivity (e.g., Ethernet) in addition to or instead of a wireless interface.

In some embodiments, communications subsystem 1524 may also receive input communication in the form of structured and/or unstructured data feeds 1526, event streams 1528, event updates 1530, and the like on behalf of one or more users who may use computer system 1500.

By way of example, communications subsystem 1524 may be configured to receive data feeds 1526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1524 may also be configured to receive data in the form of continuous data streams, which may include event streams 1528 of real-time events and/or event updates 1530, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1524 may also be configured to output the structured and/or unstructured data feeds 1526, event streams 1528, event updates 1530, and the like to one or more databases that may be in communication with one or more streaming data source computers coupled to computer system 1500.

Computer system 1500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1500 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method for transforming JavaScript Object Notation (JSON) data, the method comprising:
receiving, at a computer, a first object specified using JavaScript Object Notation (JSON), the first object having a set of one or more attributes, each attribute being of a predetermined JSON data type and having at least one value;

receiving, at the computer, a second object specified using JavaScript Object Notation, the second object having a set of one or more attributes each corresponding to at least one attribute in the set of one or more attributes of the first object and having at least one value defining one or more transformations, wherein receiving, at the computer, the second object comprises receiving an attribute of an object specified using JavaScript Object Notation having a value that defines one or more tests that define whether the one or more transformations are applicable to the first object;

determining, by the computer, a positive evaluation of the one or more tests;

transforming, by the computer, the first object specified using JavaScript Object Notation into a third object specified using JavaScript Object Notation based on the second object specified using JavaScript Object Notation based on the positive evaluation of the one or more tests, wherein the transforming comprises renaming an attribute of the first object, performing one or more numerical operations with respect to a value of an attribute of the first object, performing one or more string operations with respect to a value of an attribute of the first object, adding one or more attributes to an attribute of the first object which is also an object, or removing one or more attributes from an attribute of the first object which is also an object; and storing the third object in a storage device associated with the computer.

2. The method of claim 1 wherein receiving, at the computer, the second object comprises receiving an object specified using JavaScript Object Notation having an attribute whose name corresponds to a name of an attribute of the first object.

3. The method of claim 2 wherein receiving the object having the attribute whose name corresponds to the name of the attribute of the first object comprises receiving the attribute as having a same name as the attribute of the first object.

4. The method of claim 2 wherein receiving the object having the attribute whose name corresponds to the name of the attribute of the first object comprises receiving the attribute as having a value that references the name of the attribute of the first object.

5. The method of claim 1 wherein receiving, at the computer, the second object comprises receiving an attribute of an object specified using JavaScript Object Notation having a value that specifies an operation to be applied to either a name of an attribute of the first object or a value of the attribute of the first object.

6. The method of claim 1 wherein receiving, at the computer, the second object comprises receiving an attribute of an object specified using JavaScript Object Notation having a value that specifies a data type of an attribute of the third object corresponding to a transformation of the attribute of the first object.

7. The method of claim 1 wherein receiving, at the computer, the second object comprises receiving an attribute of an object specified using JavaScript Object Notation having a value that specifies a modification to one or more attributes of the first object.

8. The method of claim 1 wherein the one or more tests are defined with respect to one or more attributes of the first object.

9. The method according to claim 1, wherein the first object, the second object and the third object are JSON objects.

10. The method according to claim 1, wherein the second object is a JSON StyleSheet Language (JSL) document.

11. The method according to claim 1, wherein the computer is configured to transform JavaScript Object Notation data.

12. The method according to claim 1, wherein the first object comprises a JSON string.

13. A non-transitory computer-readable medium storing a computer program product executable by a processor of a computer system for transforming JavaScript Object Notation (JSON) data, the non-transitory computer-readable medium comprising:

code for receiving a first object specified using JavaScript Object Notation (JSON), the first object having a set of one or more attributes, each attribute being of a predetermined JSON data type and having at least one value code for receiving a second object specified using JavaScript Object Notation, the second object having a set of one or more attributes each corresponding to at least one attribute in the set of one or more attributes of the first object and having at least one value defining one or more transformations, wherein receiving the second object comprises receiving an attribute of an object specified using JavaScript Object Notation having a value that defines one or more tests that define whether the one or more transformations are applicable to the first object;

code for determining a positive evaluation of the one or more tests; and code for transforming the first object specified using JavaScript Object Notation into a third object specified using JavaScript Object Notation based on the second object specified using JavaScript Object Notation based on the positive evaluation of the one or more tests, wherein the transforming comprises renaming an attribute of the first object, performing one or more numerical operations with respect to a value of an attribute of the first object, performing one or more string operations with respect to a value of an attribute of the first object, adding one or more attributes to an attribute of the first object which is also an object, or removing one or more attributes from an attribute of the first object which is also an object.

14. The non-transitory computer-readable medium of claim 13 wherein the code for receiving the second object comprises code for receiving an object specified using JavaScript Object Notation having an attribute whose name corresponds to a name of an attribute of the first object.

15. The non-transitory computer-readable medium of claim 14 wherein the code for receiving the object having the attribute whose name corresponds to the name of the attribute of the first object comprises code for receiving the attribute as having the same name as the attribute of the first object.

16. The non-transitory computer-readable medium of claim 14 wherein the code for receiving the object having the attribute whose name corresponds to the name of the attribute of the first object comprises code for receiving the attribute as having a value that references the name of the attribute of the first object.

17. The non-transitory computer-readable medium of claim 13 wherein the code for receiving the second object comprises code for receiving an attribute of an object specified using JavaScript Object Notation having a value that specifies an operation to be applied to either a name of an attribute of the first object or a value of the attribute of the first object.

18. The non-transitory computer-readable medium of claim 13 wherein the code for receiving the second object comprises code for receiving an attribute of an object specified using JavaScript Object Notation having a value that specifies a data type of an attribute of the third object corresponding to a transformation of the attribute of the first object.

19. The non-transitory computer-readable medium of claim 13 wherein the code for receiving the second object comprises code for receiving an attribute of an object specified using JavaScript Object Notation having a value that specifies a modification to one or more attributes of the first object.

20. The non-transitory computer-readable medium of claim 13 wherein the code for receiving the second object comprises code for receiving an attribute of an object specified using JavaScript Object Notation having a value that defines one or more tests that define whether the one or more transformations are applicable to the first object.

21. The non-transitory computer-readable medium of claim 20 wherein the one or more tests are defined with respect to one or more attributes of the first object.

22. The non-transitory computer-readable medium of claim 20 further comprising:
   code for determining a positive evaluation of the one or more tests; and
   code for performing the one or more transformations based on the positive evaluation of the one or more tests.

23. The non-transitory computer-readable medium of claim 22 wherein the code for performing the one or more transformations comprises code for renaming an attribute of the first object, performing one or more numerical operations with respect to a value of an attribute of the first object, performing one or more string operations with respect to a value of an attribute of the first object, adding one or more attributes to an attribute of the first object which is also an object, or removing one or more attributes from an attribute of the first object which is also an object.

24. A system for transforming JavaScript Object Notation (JSON) data, the system comprising:
   a hardware processor; and
   a memory storing a set of instructions which when executed by the processor cause the processor to:
      receive a first object specified using JavaScript Object Notation (JSON), the first object having a set of one or more attributes, each attribute being of a predetermined JSON data type and having at least one value;
      receive a second object specified using JavaScript Object Notation, the second object having a set of one or more attributes each corresponding to at least one attribute in the set of attributes of the first object and having at least one value defining one or more transformations,
      wherein receiving the second object comprises receiving an attribute of an object specified using JavaScript Object Notation having a value that defines one or more tests that define whether the one or more transformations are applicable to the first object;
      determine a positive evaluation of the one or more tests; and
      transform the first object specified using JavaScript Object Notation into a third object specified using JavaScript Object Notation based on the second object specified using JavaScript Object Notation based on the positive evaluation of the one or more tests,
      wherein the transforming comprises renaming an attribute of the first object, performing one or more numerical operations with respect to a value of an attribute of the first object, performing one or more string operations with respect to a value of an attribute of the first object, adding one or more attributes to an attribute of the first object which is also an object, or removing one or more attributes from an attribute of the first object which is also an object.

* * * * *

UNITED STATES PATENT AND TRADEMARK OFFICE
CERTIFICATE OF CORRECTION

PATENT NO. : 9,971,574 B2  
APPLICATION NO. : 14/529546  
DATED : May 15, 2018  
INVENTOR(S) : Jayaraj et al.

Page 1 of 1

It is certified that error appears in the above-identified patent and that said Letters Patent is hereby corrected as shown below:

On the Title Page

Item (72), Column 1, under Inventors, Line 1, delete "Alex Mathew," and insert -- Alex Mathew Jayaraj, --, therefor.

Signed and Sealed this  
Thirteenth Day of November, 2018

Andrei Iancu  
*Director of the United States Patent and Trademark Office*